United States Patent
Yamaguchi et al.

(10) Patent No.: US 9,632,646 B2
(45) Date of Patent: Apr. 25, 2017

(54) ELECTRONIC APPARATUS

(71) Applicant: PANASONIC INTELLECTUAL PROPERTY MANAGEMENT CO., LTD., Osaka (JP)

(72) Inventors: Takeshi Yamaguchi, Kanagawa (JP); Tomoki Takano, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 14/643,344

(22) Filed: Mar. 10, 2015

(65) Prior Publication Data

US 2015/0370387 A1    Dec. 24, 2015

(30) Foreign Application Priority Data

Jun. 20, 2014 (JP) ................................ 2014-127380
Sep. 3, 2014 (JP) ................................ 2014-179336

(51) Int. Cl.
G06F 3/044 (2006.01)
G06F 3/047 (2006.01)
G06F 3/041 (2006.01)

(52) U.S. Cl.
CPC .............. *G06F 3/047* (2013.01); *G06F 3/044* (2013.01); *G06F 3/0414* (2013.01)

(58) Field of Classification Search
CPC combination set(s) only.
See application file for complete search history.

(56) References Cited

U.S. PATENT DOCUMENTS 6,492,979 B1    12/2002  Kent et al.
2006/0244733 A1    11/2006  Geaghan
(Continued)

FOREIGN PATENT DOCUMENTS

EP    2804088    11/2014
JP    2006-323457    11/2006
(Continued)

OTHER PUBLICATIONS

British Search Report dated Aug. 17, 2015 for the related British Patent Application No. GB1503428.3.
(Continued)

*Primary Examiner* — Van Chow
(74) *Attorney, Agent, or Firm* — Greenblum & Bernstein, P.L.C.

(57) ABSTRACT

Provided is an electronic apparatus including a casing, a display unit, an electrostatic capacitive touch panel, a gravity sensor, and a step. The display unit is disposed in the casing, has a predetermined shape, and displays predetermined information. The electrostatic capacitive touch panel has a shape substantially the same as the predetermined shape and determines a two-dimensional coordinate indicated by an instructing object which has some conductivity and display of the display unit passes through the electrostatic capacitive touch panel. The gravity sensor enables detection of a perpendicular direction. The step is disposed along a side of the predetermined shape, is low on an inside of the predetermined shape and is high on an outside of the predetermined shape. A nullification region at which the two-dimensional coordinate is nullified is enabled to be disposed along the side and the nullification region is disposed along the side in a perpendicular direction.

15 Claims, 29 Drawing Sheets

(56) References Cited

U.S. PATENT DOCUMENTS

| | | |
|---|---|---|
| 2009/0065267 A1 | 3/2009 | Sato |
| 2012/0023459 A1 | 1/2012 | Westerman |
| 2012/0105481 A1 | 5/2012 | Baek et al. |
| 2013/0285956 A1 | 10/2013 | Kamii et al. |
| 2014/0176458 A1 | 6/2014 | Matsuda |
| 2014/0340557 A1 | 11/2014 | Ishihara et al. |
| 2015/0121229 A1* | 4/2015 | Wang .................... G06F 3/0484 715/728 |

FOREIGN PATENT DOCUMENTS

| | | |
|---|---|---|
| JP | 2009-087311 | 4/2009 |
| JP | 2014-123288 | 7/2014 |
| WO | 02/35461 | 5/2002 |
| WO | 2006/133018 | 12/2006 |

OTHER PUBLICATIONS

British Search Report dated Aug. 17, 2015 for the related British Patent Application No. GB1503430.9.

\* cited by examiner

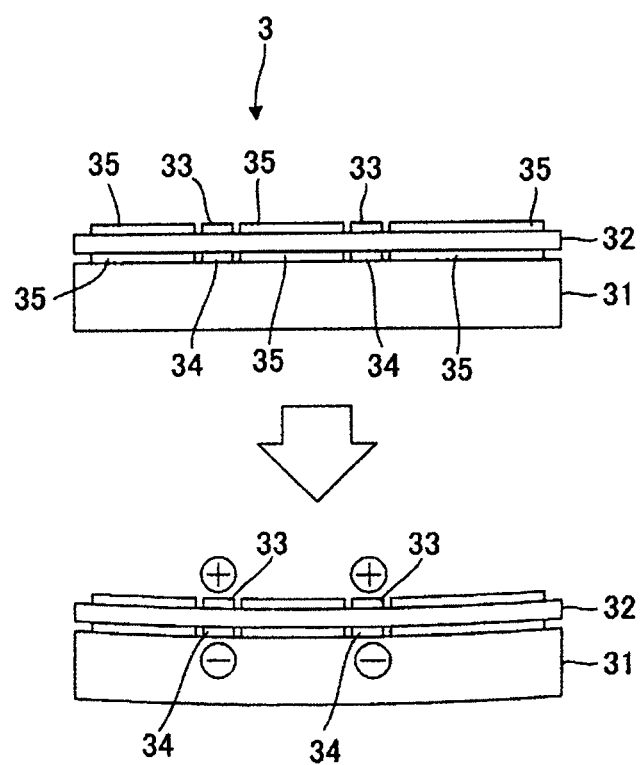

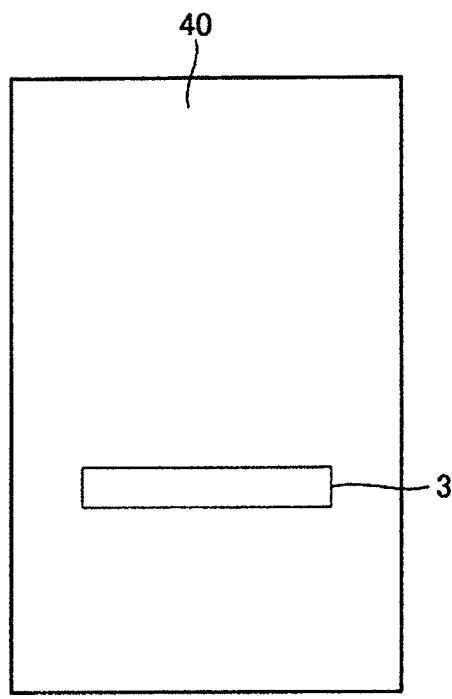

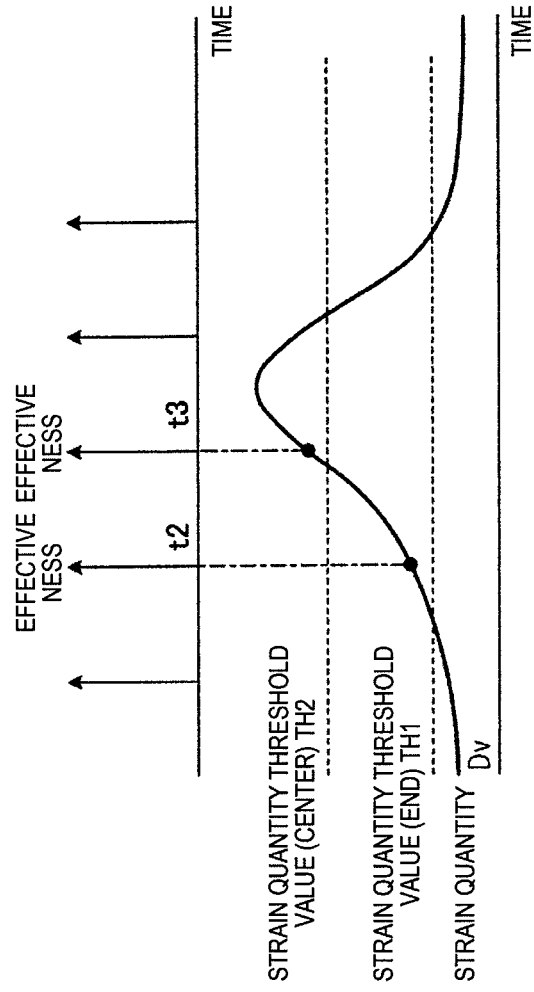
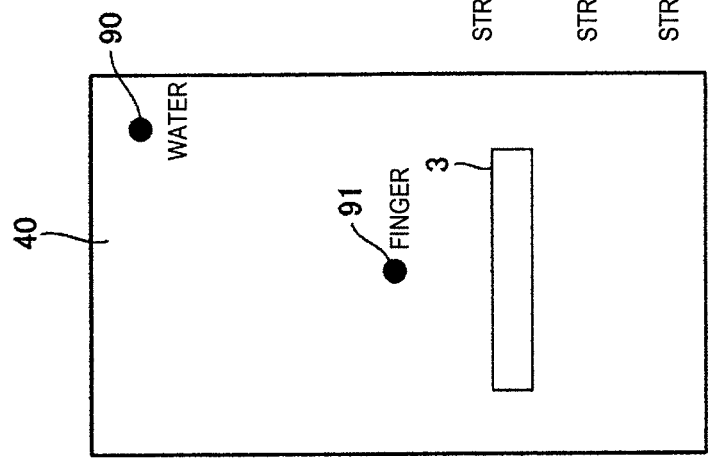

FIG. 20

| 500 | 500 | 500 | 500 | 500 |
|-----|-----|-----|-----|-----|
| 500 | 3   | 7   | 3   | 500 |
| 500 | 10  | 15  | 10  | 500 |
| 500 | 25  | 40  | 25  | 500 |
| 500 | 50  | 70  | 50  | 500 |
| 500 | 40  | 50  | 40  | 500 |
| 500 | 25  | 30  | 25  | 500 |
| 500 | 500 | 500 | 500 | 500 |

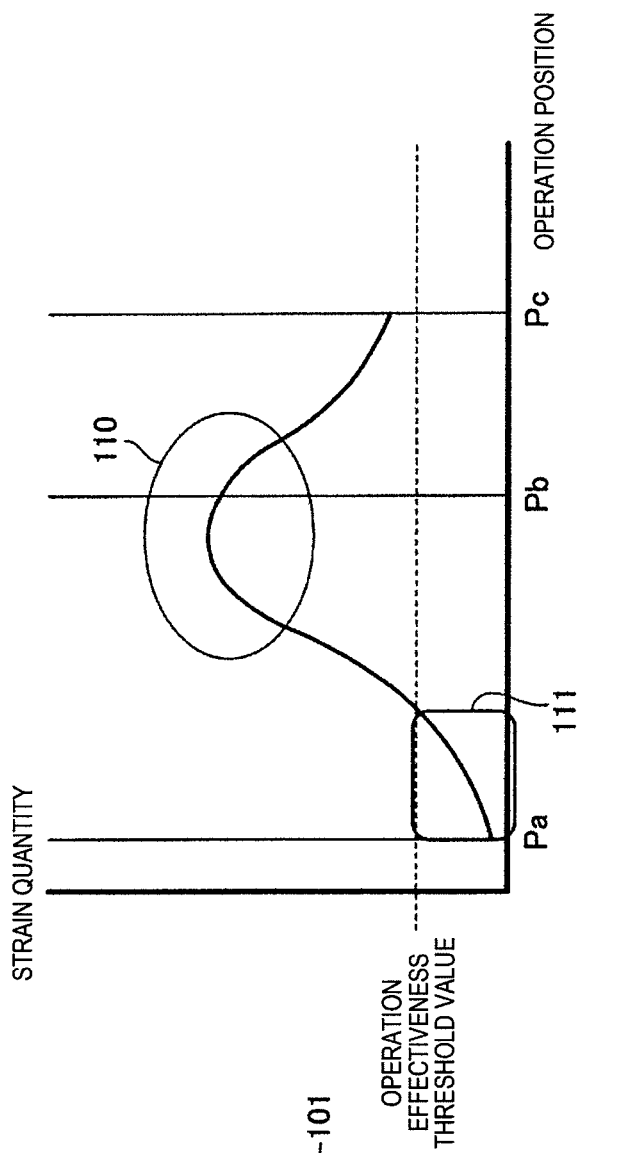
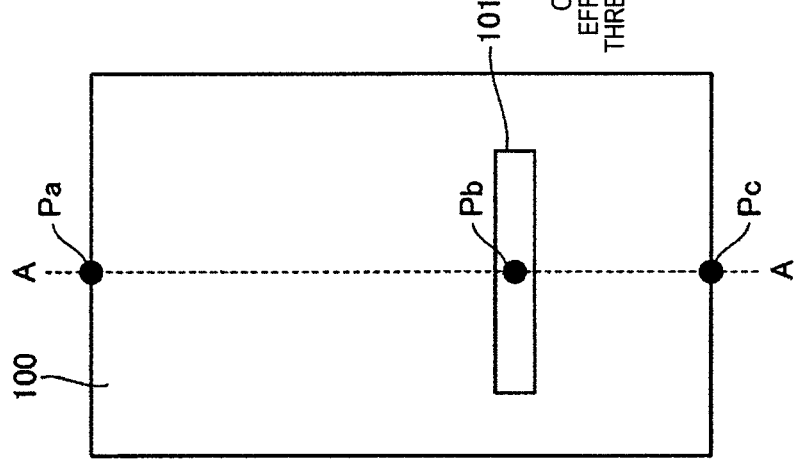

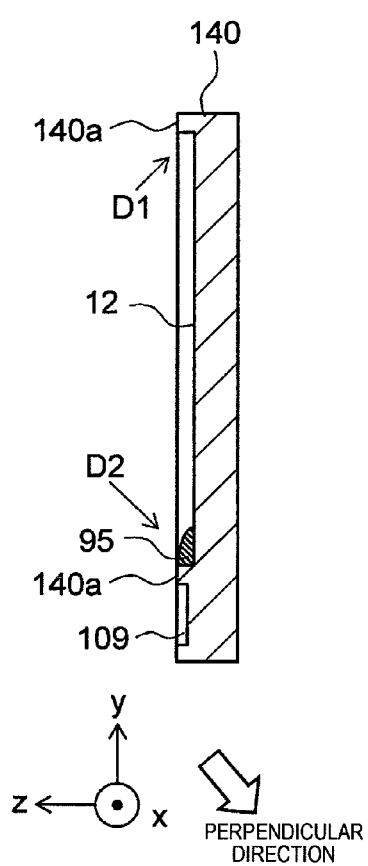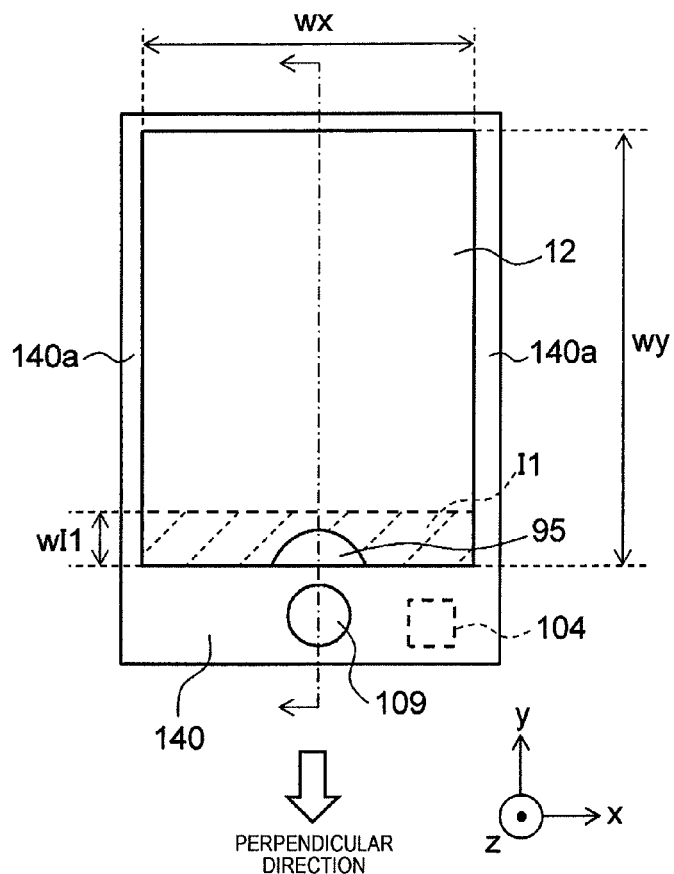

1,50,60,70,130

1,50,60,70,130

ELECTRONIC APPARATUS

CROSS REFERENCE TO RELATED APPLICATIONS

This application claims priority to Japanese Patent Application No. 2014-127380 filed Jun. 20, 2014 and Japanese Patent Application No. 2014-179336 filed Sep. 3, 2014, the entire contents of which are incorporated by reference herein.

BACKGROUND OF THE INVENTION

1. Field of the Invention

The present invention relates to an electronic apparatus including a touch panel.

2. Description of the Related Art

An electronic apparatus such as a smartphone and a tablet, in which a touch panel is mounted, has come into wide use. The electronic apparatus may include an electrostatic capacitive touch panel. The electrostatic capacitive touch panel can receive "touch operation" performed by directly bringing a finger of a bare hand into contact with a surface of the touch panel and "hover operation" performed by causing a finger to be positioned at a predetermined height from the surface of the touch panel, without bringing the finger of the bare hand onto contact with the surface of the touch panel. Accordingly, a user can perform an operation with a finger covered with gloves in addition to a bare hand.

Examples of a touch panel of a type of receiving "touch operation" are disclosed in Japanese Patent Unexamined Publication No. 2009-087311 and Japanese Patent Unexamined Publication No. 2006-323457. An example of a technique of changing sensitivity of a touch panel in a perpendicular direction is disclosed in Japanese Patent Unexamined Publication No. 2014-123288.

If an electronic apparatus having a step around a touch panel is held with a slope and used in the rain, rain droplets coming into contact with the touch panel may flow along the touch panel and be collected as water droplets in the vicinity of the step.

Particularly, water droplets which are collected in the vicinity of the step may be incorrectly detected as an operation of a user in a case of an electrostatic capacitive touch panel having high sensitivity for receiving a hover operation.

SUMMARY OF THE INVENTION

According to the present invention, there is provided an electronic apparatus including a casing, a display unit, an electrostatic capacitive touch panel, a gravity sensor, and a step. The display unit is disposed in the casing, has a predetermined shape, and displays predetermined information. The electrostatic capacitive touch panel has a shape substantially the same as the predetermined shape and determines a two-dimensional coordinate indicated by an instructing object which has some conductivity and display of the display unit passes through the electrostatic capacitive touch panel. The gravity sensor enables detection of a perpendicular direction. The step is disposed along a side of the predetermined shape, is low on an inside of the predetermined shape and is high on an outside of the predetermined shape. In the electronic apparatus, a nullification region at which the two-dimensional coordinate is nullified is enabled to be disposed along a side and the nullification region is disposed along the side in a perpendicular direction.

According to the configuration, a nullification region is disposed along a side of a touch panel in a perpendicular direction, on which water droplets are easily collected. Accordingly, when water droplets are collected at a step which is disposed along the side, it is possible to reduce probability of incorrectly detecting the collected water droplets as an operation of a user.

In the electronic apparatus of the present invention, a position of the nullification region disposed along the side in a perpendicular direction may be changed depending on rotation of the casing and a change of the perpendicular direction of the casing.

In the electronic apparatus of the present invention, the height of the step may be substantially constant regardless of the side of the predetermined shape.

In the electronic apparatus of the present invention, the nullification region may have a predetermined width along the side and the predetermined width may be substantially constant regardless of the perpendicular direction. According to the electronic apparatus of the present invention, the display unit may enable display of the two-dimensional coordinate and may not display the two-dimensional coordinate corresponding to the nullification region.

In the electronic apparatus of the present invention, the predetermined shape may be quadrangular.

In the electronic apparatus of the present invention, the touch panel may enable determination of the two-dimensional coordinate indicated by the instructing object which is at a predetermined distance from the touch panel.

In the electronic apparatus of the present invention, the instructing object may be a finger of a person and the touch panel may enable determination of the two-dimensional coordinate indicated by the finger covered with gloves which have an insulation property.

The electronic apparatus of the present invention may further include a transparent member that is disposed to be stacked on the touch panel and has some transmittance. The touch panel is disposed between the transparent member and the display unit.

In the electronic apparatus of the present invention, the transparent member and the touch panel may be integrally formed.

In the electronic apparatus of the present invention, the casing may have an edge portion at at least one portion of the surroundings of the touch panel and the step may be formed between the edge portion and the transparent member.

In the electronic apparatus of the present invention, the display unit may perform predetermined display at the nullification region.

In the electronic apparatus of the present invention, the predetermined display may refer to filling of the nullification region with a predetermined color.

In the electronic apparatus of the present invention, the predetermined color may be black.

In the electronic apparatus of the present invention, the filling with the predetermined color may be performed to have some transmittance.

According to the present invention, a nullification region is disposed along a side of a touch panel in a perpendicular direction, on which water droplets are easily collected. Accordingly, when water droplets are collected at a step which is disposed along the side, it is possible to reduce probability of incorrectly detecting the collected water droplets as an operation of a user.

BRIEF DESCRIPTION OF DRAWINGS

FIG. 4 is a diagram illustrating a schematic configuration of the pressure detection unit of the electronic apparatus according to Exemplary Embodiment 1;

FIG. 5A is a diagram illustrating a specific example of a strain quantity threshold value set in the electronic apparatus according to Exemplary Embodiment 1;

FIG. 5B is a diagram illustrating a specific example of a strain quantity threshold value set in the electronic apparatus according to Exemplary Embodiment 1;

FIG. 13A is a diagram illustrating a problem which is the assumption of an electronic apparatus according to Exemplary Embodiment 3 of the present invention;

FIG. 13B is a diagram illustrating the problem which is the assumption of an electronic apparatus according to Exemplary Embodiment 3 of the present invention;

FIG. 20 is a diagram illustrating an example of a strain quantity threshold value in the electronic apparatus according to Exemplary Embodiment 4;

FIG. 21A is a diagram illustrating a problem in the related art;

FIG. 21B is a diagram illustrating the problem in the related art;

FIG. 28A is a view of an appearance of the electronic apparatus according to Exemplary Embodiment 5 of the present invention when the electronic apparatus stands up in a longitudinal direction;

FIG. 28B is a cross-sectional view of the electronic apparatus according to Exemplary Embodiment 5 of the present invention when the electronic apparatus stands up in the longitudinal direction;

DETAILED DESCRIPTION OF THE PREFERRED EMBODIMENTS

Figure 1:
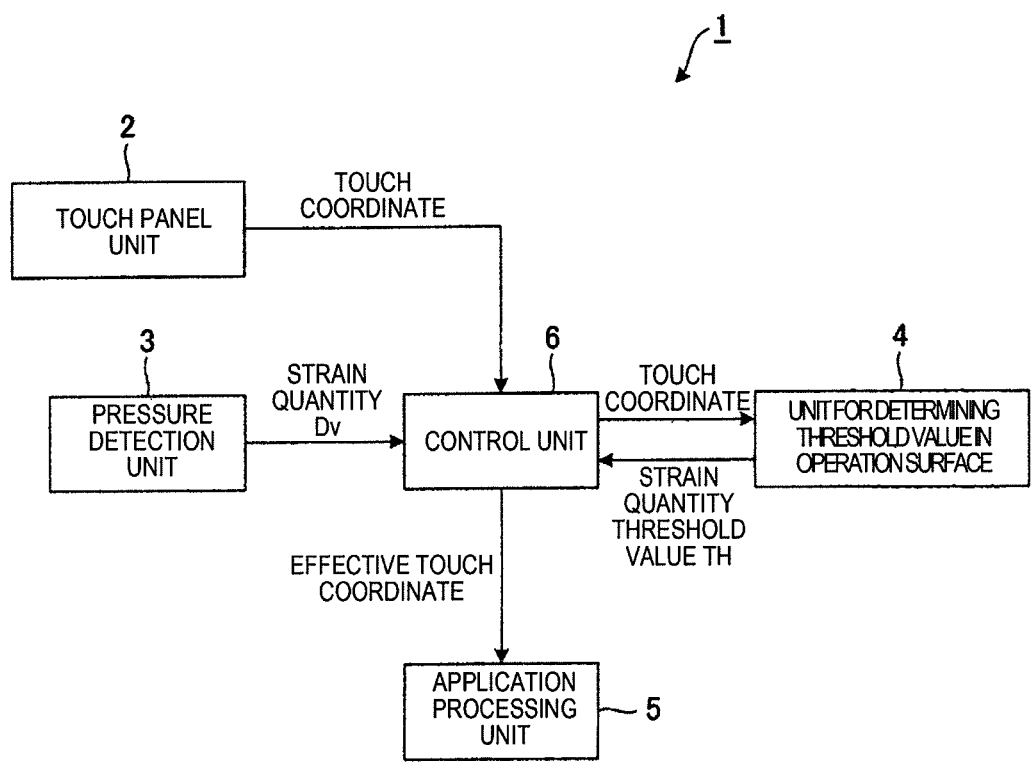
FIG. 1 is a block diagram illustrating a schematic configuration of an electronic apparatus according to Exemplary Embodiment 1 of the present invention.

Problem Relating to Exemplary Embodiments 1 to 4

In an electrostatic capacitive touch panel, a two-dimensional coordinate obtained when water or the like is attached to a surface of the panel may be caused to be effective. This problem may be avoided by detecting strength of pressure applied to the touch panel and not detecting pressure due to attachment of the water or the like. For example, strain when water or the like is attached is detected by using a strain sensor and a two-dimensional coordinate when a detected strain quantity is equal to or less than a predetermined threshold value is caused not to be effective.

However, even though the strain sensor is provided to prevent incorrect response, the strain quantity for determining that an operation on an operation surface is effective varies in accordance with a location at which the strain sensor is disposed. That is, since the strain sensor has a size smaller than that of the touch panel, a strain quantity at a position of the touch panel far from the strain sensor is detected to be small and a strain quantity at a position of the touch panel closer to the strain sensor is detected to be large. For example, when the strain sensor is disposed at the center portion of the touch panel, a strain quantity at the center portion of the touch panel is large and a strain quantity at an end of the touch panel is small. In this manner, a touch operation may be caused not to be effective in accordance with a location on the touch panel.

Operability and incorrect detection have the trade-off relationship. Thus, as the strain quantity for causing to be effective becomes smaller, incorrect detection, for example, that an electrical noise or vibration which is not caused by an operation is determined to be effective increases. On the other hand, as the strain quantity for causing to be effective becomes larger, it is difficult to effectively detect strain at an end of the panel.

FIGS. 21A and 21B illustrate the above-described problems. FIG. 21A illustrates operation surface 100 and strain sensor 101. As illustrated in FIG. 21A, strain sensor 101 is disposed at a position which is a little lower than the center of operation surface 100 and an touch operation is performed on an A-A line of operation surface 100, which passes through the center portion of strain sensor 101, with the same extent of strength. FIG. 21B illustrates strain quantities detected by strain sensor 101 at this time.

A touch position Pa on operation surface 100 corresponds to a position on the A-A line at an upper end (an end on an upper side towards the drawing is referred to as an upper end) of operation surface 100. A touch position Pb corresponds to a position on a position of strain sensor 101 on the A-A line in operation surface 100. A touch position Pc corresponds to a position on the A-A line at a lower end (an end on a lower side toward the drawing is referred to a lower end) of operation surface 100. Since the touch position Pa is farthest from strain sensor 101, the detected strain quantity is small, as illustrated in FIG. 21B. Since the touch position Pb is a position at which strain sensor 101 is disposed, the detected strain quantity is large as illustrated in FIG. 21B. Since the touch position Pc is a position with a distance which is substantially half of the distance from strain sensor 101 to the touch position Pa, the detected strain quantity is larger than the strain quantity at the touch position Pa and smaller than the strain quantity at the touch position Pb.

An operation effectiveness threshold value is set so as to determine whether or not a touch operation is performed. Since the influence of a touch operation on strain sensor 101 is large at the touch position Pb with surroundings 110 of the touch position Pb, a detectable strain quantity exceeds a threshold value although an operation with weak force is performed. That is, effectiveness is caused although an operation with weak force compared to surroundings is performed. The influence of the touch operation on strain sensor 101 at the touch position Pc is not larger than that at the touch position Pb, but a detectable strain quantity by an operation with a little force exceeds the threshold value. Since the influence of the touch operation on strain sensor 101 is very small at the touch position Pa with surroundings 111 of the touch position Pa, a detectable strain quantity does not exceed a threshold value and it is difficult to determine the touch operation to be performed. In this manner, a strain quantity for determining the touch operation to be effective on operation surface 100 varies in accordance with the location at which strain sensor 101 is disposed. The touch operation may also have an influence on strain sensor 101 at the touch position Pa by decreasing the threshold value. However, decreasing the threshold value causes an incorrect response due to a noise.

Considering the circumstances, an object of the present invention is to provide an electronic apparatus in which a two-dimensional coordinate obtained by an operation by an operation of touching any point on the operation surface of the touch panel unit is caused to be effective and a two-dimensional coordinate obtained by water or the like is caused not to be effective when the water or the like is attached to the operation surface.

Hereinafter, preferred exemplary embodiments for implementing the present invention will be described in detail with reference to the drawings.

Exemplary Embodiment 1

Figure 2:
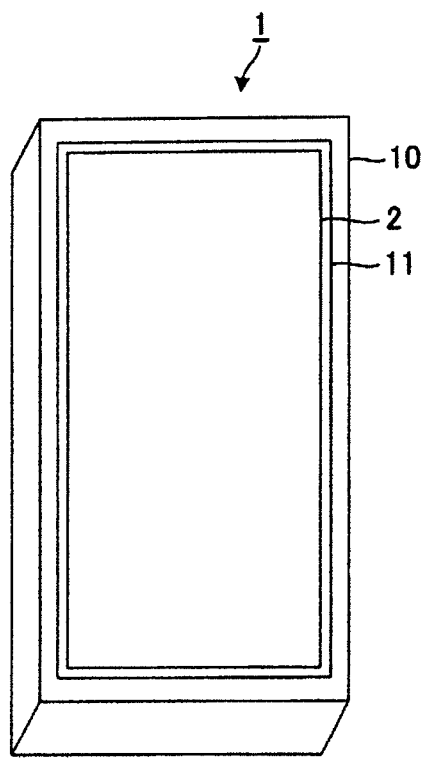
FIG. 2 is a perspective view illustrating an appearance of the electronic apparatus according to Exemplary Embodiment 1
Figure 3:
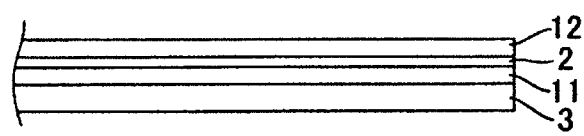
FIG. 3 is a cross-sectional view illustrating a pressure detection unit, a display unit, a touch panel unit, and a transparent member of the electronic apparatus according to Exemplary Embodiment 1.

FIG. 1 is a block diagram illustrating a schematic configuration of an electronic apparatus according to Exemplary Embodiment 1 of the present invention. FIG. 2 is a perspective view illustrating the appearance of the electronic apparatus in FIG. 1. FIG. 3 is a cross-sectional view illustrating a pressure detection unit, a display unit, a touch panel unit, and a transparent member of the electronic apparatus in FIG. 1. Electronic apparatus 1 according to this exemplary embodiment is applied to a portable wireless device referred to as a smartphone, for example and a part functioning as a wireless device is not illustrated in the block diagram of FIG. 1.

In FIG. 1, electronic apparatus 1 according to this exemplary embodiment includes touch panel unit 2, pressure detection unit 3, unit for determining threshold value in operation surface 4, application processing unit 5, and control unit 6. As illustrated in FIG. 2, electronic apparatus 1 according to this exemplary embodiment includes rectangular casing 10. Touch panel unit 2 and display unit 11 are disposed on the front surface side of casing 10. In this case, as illustrated in FIG. 3, regarding touch panel unit 2, pressure detection unit 3, display unit 11, and transparent member 12, touch panel unit 2 and transparent member 12 are disposed to be stacked on an upper surface side of display unit 11 in this order and pressure detection unit 3 is disposed on a lower surface side of display unit 11. Touch panel unit 2 and display unit 11 have a surface shape having an area a little smaller than an area of the front surface of casing 10 and are formed with a rectangular shape in a plan view. In this case, the area of touch panel unit 2 is a little smaller than the area of display unit 11. Touch panel unit 2 is disposed to be stacked on a display surface side of display unit 11 and thus touch panel unit 2 is substantially parallel with the display surface of display unit 11.

In FIG. 1, touch panel unit 2 employs a electrostatic capacitive type touch panel in which an operation (referred to as a "hover operation") at a height within a predetermined range is possible without an instructing object (a finger of a user, a pen, and the like) being brought onto contact with an operation surface of touch panel unit 2. Touch panel unit 2 is disposed to be stacked on a display surface side of display unit 11, passes through display of display unit 11, determines a two-dimensional coordinate (below, referred to as "touch coordinate") indicated by the instructing object having some conductivity, and outputs the determined touch coordinate. Touch panel unit 2 outputs a coordinate (touch coordinate) of the center of the instructing object along the operation surface of touch panel unit 2 by detecting the instructing object to control unit 6. Touch panel unit 2 causes a perpendicular distance from the operation surface of touch panel unit 2 to the instructing object to be included in the touch coordinate when the touch coordinate is output. That is, touch panel unit 2 outputs a two-dimensional coordinate corresponding to a touch position and a perpendicular distance to control unit 6.

In FIG. 2 and FIG. 3, display unit 11 is formed to have a rectangular shape and is used in display for operating electronic apparatus 1 or display of an image and the like. A liquid crystal display (LCD), an organic electroluminescence (EL) or a display device such as electronic paper is used as display unit 11. In FIG. 3, transparent member 12 is disposed to be stacked on the upper surface side of touch panel unit 2 and passes through display of display unit 11. Transparent member 12 may be integrally formed with touch panel unit 2 or may be formed separately from touch panel unit 2.

In FIG. 1 and FIG. 3, pressure detection unit 3 is disposed to be stacked on the lower surface side of display unit 11 and detects strain in transparent member 12. Pressure detection unit 3 includes a strain sensor (not illustrated) having an area smaller than that of transparent member 12 and outputs strain detected by the strain sensor as a strain quantity. For example, a piezoelectric element or a piezoelectric film is used as the strain sensor of pressure detection unit 3. A configuration of pressure detection unit 3 using a piezoelectric film and a detection principle of pressing force generated by the piezoelectric film will be described. FIG. 4 is a diagram illustrating a schematic configuration of pressure detection unit 3 using a piezoelectric film. In FIG. 4, pressure detection unit 3 includes base plate 31 and a piezoelectric film 32 and has a structure in which base plate 31 and piezoelectric film 32 are stacked on each other. Pressing force detecting electrode patterns 33 and 34 are formed on both surfaces of piezoelectric film 32. Charges are generated in piezoelectric film 32 due to minute bending of base plate 31 and a voltage is generated between the pressing force detecting electrode patterns 33 and 34. It is possible to detect pressing force based on the voltage. Since charges are generated in piezoelectric film 32 by slight bending of base plate 31, it is also possible to detect small pressing force. Predetermined patterns 35 other than the pressing force detecting electrode patterns 33 and 34 are disposed on both of the surfaces of piezoelectric film 32 in pressure detection unit 3 of FIG. 4. Predetermined patterns 35 may be used similarly to the pressing force detecting electrode patterns 33 and 34, and may be used for causing a signal to be transmitted.

In FIG. 1, unit for determining threshold value in operation surface 4 determines a threshold value corresponding to the touch coordinate output from touch panel unit 2 and outputs the determined threshold value as a threshold value (below referred to as a "strain quantity threshold value (predetermined threshold value)" TH) of the strain quantity. Strain quantity threshold value TH is set for each subdivision which is obtained by dividing the operation surface of touch panel unit 2 into predetermined subdivisions. Examples of the shape of the subdivision include a quadrangle and a triangle.

FIGS. 5A and 5B are diagrams illustrating a specific example of strain quantity threshold value TH. In this case, as illustrated in FIG. 5A, pressure detection unit 3 is disposed at a position which is a little lower than the center of operation surface 40 of touch panel unit 2. Strain quantity threshold value TH is set for each subdivision which is obtained by dividing operation surface 40 of touch panel unit 2 into 40 subdivisions of breadthwise 5×lengthwise 8. In this case, as illustrated in FIG. 5B, large strain quantity threshold value TH is set in portion 41 at which a detectable strain quantity is large physically such as the vicinity of pressure detection unit 3 and small strain quantity threshold value TH is set in portion 42 at which a detectable strain quantity is small physically such as an end of operation surface 40. For example, each strain quantity threshold value TH of "50", "70", "50", "40", "50", and "40" is set in portion 41 at which pressure detection unit 3 is disposed. Each strain quantity threshold value TH of "1", "2", "3", "2", and "1" is set in portion 42 which is the farthest from a portion at which pressure detection unit 3 is disposed. In this manner, strain quantity threshold value TH is set for each divided predetermined subdivision which is obtained by dividing operation surface 40 of touch panel unit 2 into a plurality of subdivisions.

In FIG. 1, strain quantity threshold value TH determined by the unit for determining threshold values in operation surface 4 is output to control unit 6. Control unit 6 is configured by a central processing unit (CPU), a read only memory (ROM), a random access memory (RAM), and an interface circuit. A program for controlling the CPU is stored in the ROM and the RAM is used when the CPU is operated. Control unit 6 obtains a touch coordinate determined by touch panel unit 2 for each constant period and outputs the obtained touch coordinate to unit for determining threshold value in operation surface 4. Control unit 6 receives strain quantity Dv detected by pressure detection unit 3 and receives strain quantity threshold value TH determined by the unit for determining threshold values in operation surface 4. Control unit 6 compares strain quantity Dv with strain quantity threshold value TH. When strain quantity Dv detected by pressure detection unit 3 is larger than strain quantity threshold value TH determined by the unit for determining threshold values in operation surface 4, the touch coordinate determined by touch panel unit 2 is caused to be effective and the touch coordinate caused to be effective is output as an effective touch coordinate to application processing unit 5. Application processing unit 5 performs various processes based on the effective touch coordinate. Description is not necessary, but strain quantity Dv and strain quantity threshold value TH which are compared by control unit 6 are obtained at the same touch coordinate.

Figure 6B:
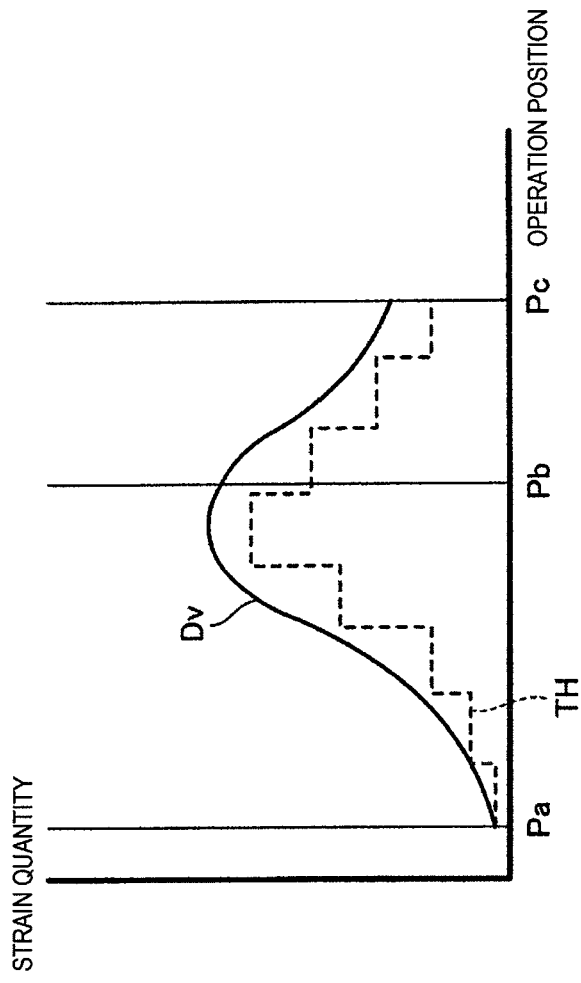
FIG. 6B is a diagram illustrating a strain quantity allowed to be detected when touching is performed with the same extent of strength on an A-A line on the operation surface, in the positional relationship.
Figure 6A:
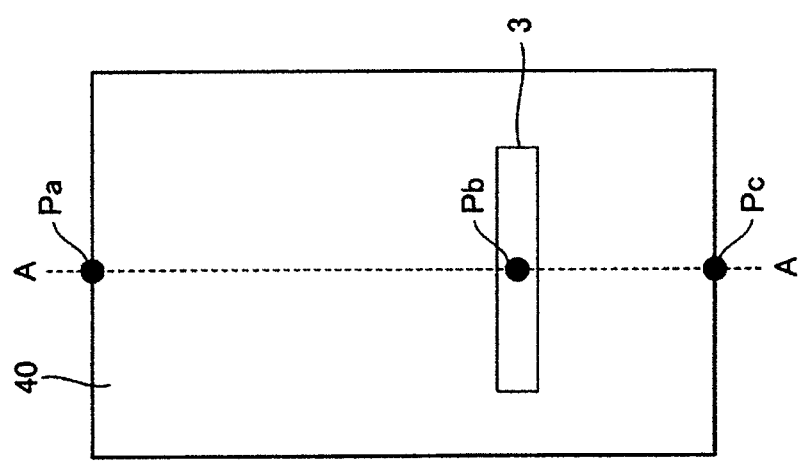
FIG. 6A is a diagram illustrating the positional relationship of the pressure detection unit on an operation surface of the electronic apparatus according to Exemplary Embodiment 1.

FIGS. 6A and 6B are diagrams illustrating a positional relationship of touch panel unit 2 on operation surface 40 and illustrating strain quantity Dv allowed to be detected when touching is performed with the same extent of strength on an A-A line on operation surface 40, in the positional relationship. As illustrated in FIG. 6A, touch position Pa on operation surface 40 corresponds to a position on the A-A line at an upper end (an end on an upper side towards the drawing is referred to as an upper end) of operation surface 40. Touch position Pb corresponds to a position on a position of pressure detection unit 3 on the A-A line in operation surface 40. Touch position Pc corresponds to a position on the A-A line at a lower end (an end on a lower side toward the drawing is referred to a lower end) of operation surface 40.

Touch position Pa is farthest from pressure detection unit 3 and detected strain quantity Dv has a small value as illustrated in FIG. 6B. Pressure detection unit 3 is disposed at touch position Pb and detected strain quantity Dv has a large value as illustrated in FIG. 6B. Touch position Pc is at a distance which is substantially a half of a distance from pressure detection unit 3 to touch position Pa and detected strain quantity Dv has a value larger than strain quantity Dv at touch position Pa and smaller than strain quantity Dv at touch position Pb.

Strain quantity threshold value TH is set so as to determine effectiveness of an operation toward operation surface 40 of touch panel unit 2. Strain quantity threshold value TH is set for each subdivision of operation surface 40 which is divided into a plurality of subdivisions as described above. The strain quantity threshold value which is set for each subdivision is smaller than a strain quantity detected by pressure detection unit 3 when touching is performed for each subdivision. With this, a touch coordinate obtained by an operation in which touching is performed any point on operation surface 40 becomes effective. The minimum value of strain quantity threshold value TH is set to a value for not performing detection when water or the like is attached to operation surface 40 or a value which is larger than a value of an electric noise. That is, the minimum value of strain quantity threshold value TH is set to a value which is larger than a strain quantity when water or the like is attached to operation surface 40. A touch coordinate obtained by water is not effective even when the water or the like is attached to operation surface 40, by determining a value of strain quantity threshold value TH in this manner.

Figure 7:
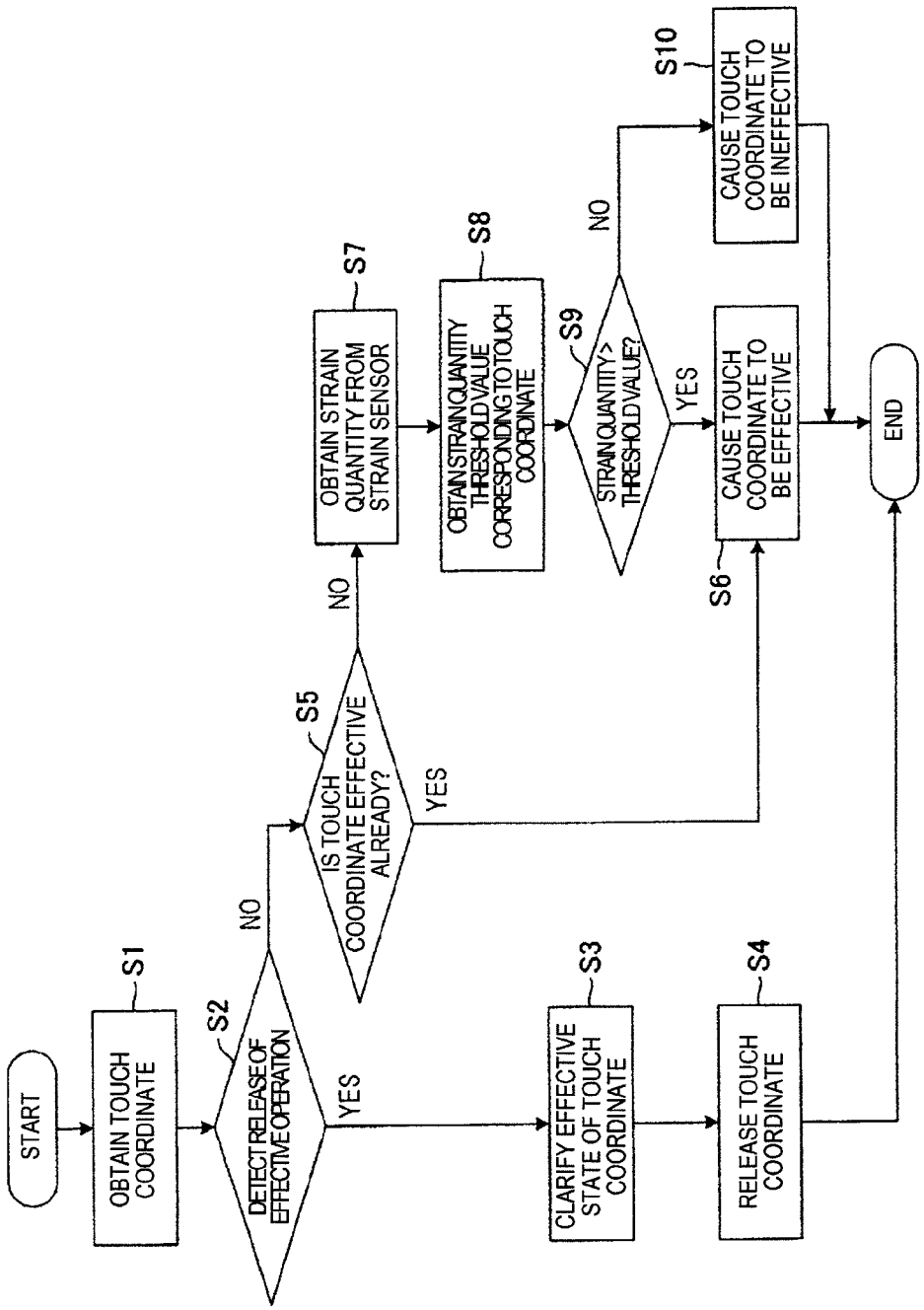
FIG. 7 is a flowchart illustrating an operation of a control unit of the electronic apparatus according to Exemplary Embodiment 1.

FIG. 7 is a flowchart illustrating an operation of control unit 6 of electronic apparatus 1 according to Exemplary Embodiment 1. In FIG. 7, control unit 6 obtains a touch coordinate output from touch panel unit 2 (Step S1) and outputs the obtained touch coordinate to the unit for determining threshold values in operation surface 4. That is, a user touching operation surface 40 of touch panel unit 2 causes touch panel unit 2 to determine a touch coordinate corresponding to a touch position and to output the determined touch coordinate to unit for determining threshold value in operation surface 4.

Control unit 6 determines whether or not release of an effective operation can be detected, based on the obtained touch coordinate after the coordinate is output to unit for determining threshold value in operation surface 4 (Step S2). In electronic apparatus 1 according to this exemplary embodiment, the operation is effective for a period from a time when operation surface 40 of touch panel unit 2 is touched with a finger to a time when the touch is released. Thus, if a finger is released from operation surface 40, it is determined that an effective operation is released. That is, control unit 6 traces the touch coordinate and recognizes an operation when the touch coordinate is changed to any coordinate as an operation performed by the same finger. Control unit 6 determines the touch coordinate which is determined to be effective once to be effective until a finger is determined to be released from operation surface 40 of touch panel unit 2.

Control unit 6 causes an effective state of the touch coordinate to be clear when it is determined that release of the effective operation is detected (when there is determination of YES in Step S2) (Step S3). That is, the touch coordinate is caused to be ineffective. After the effective state of the touch coordinate is caused to be clear, the touch coordinate is released (Step S4) and the process is ended.

In the determination of Step S2, control unit 6 determines whether or not the touch coordinate is already effective when it is determined that it is difficult to detect release of the effective operation (when there is determination of NO in Step S2), that is, when it is determined that a finger is not separated from operation surface 40 (Step S5). That is, control unit 6 determines whether or not a state where a finger comes into contact with operation surface 40 of touch panel unit 2 continues. In this determination, when it is determined that the touch coordinate is already effective (when there is determination of YES in Step S5), that is, when it is determined that the state where a finger comes into contact with operation surface 40 continues, the touch coordinate is caused to be effective (Step S6) and the process is ended.

Control unit 6 obtains a strain quantity Dv detected by pressure detection unit 3 when it is determined that the touch coordinate is not effective (when there is determination of NO in Step S5), that is, when the touch coordinate is obtained, but a strain quantity is smaller than the predetermined threshold value (Step S7). Control unit 6 obtains strain quantity threshold value TH corresponding to the touch coordinate (particularly, two-dimensional coordinate) from unit for determining threshold value in operation surface 4 (Step S8). Strain quantity Dv in the touch coordinate is obtained, strain quantity threshold value TH corresponding to the touch coordinate is obtained, and then the obtained strain quantity Dv and strain quantity threshold value TH are compared (Step S9). When it is determined that strain quantity Dv is larger than strain quantity threshold value TH (when there is determination of YES in Step S9), the touch coordinate is caused to be effective (Step S6) and the process is ended. On the other hand, when it is determined that strain quantity Dv is equal to or less than strain quantity threshold value TH (when there is determination of NO in Step S9), the touch coordinate is caused to be ineffective (Step S10) and the process is ended. The above processes (Steps S1 to S10) are executed whenever a touch coordinate is obtained.

With such electronic apparatus 1 according to Exemplary Embodiment 1, strain quantity threshold value TH is set in accordance with a distance from pressure detection unit 3 for each divided predetermined subdivision which is obtained by dividing operation surface 40 of touch panel unit 2 into a plurality of predetermined subdivisions. Thus, a two-dimensional coordinate obtained through an operation of touching any point on operation surface 40 of touch panel unit 2 is effective. In addition, the minimum value of strain quantity threshold value TH is set to be a value which is larger than strain quantity Dv when water or the like is attached to operation surface 40 of the touch panel unit or to be a value which is larger than a value of an electric noise.

Thus, a touch coordinate obtained by water is not effective when the water or the like is attached to operation surface 40.

Exemplary Embodiment 2

Figure 8:
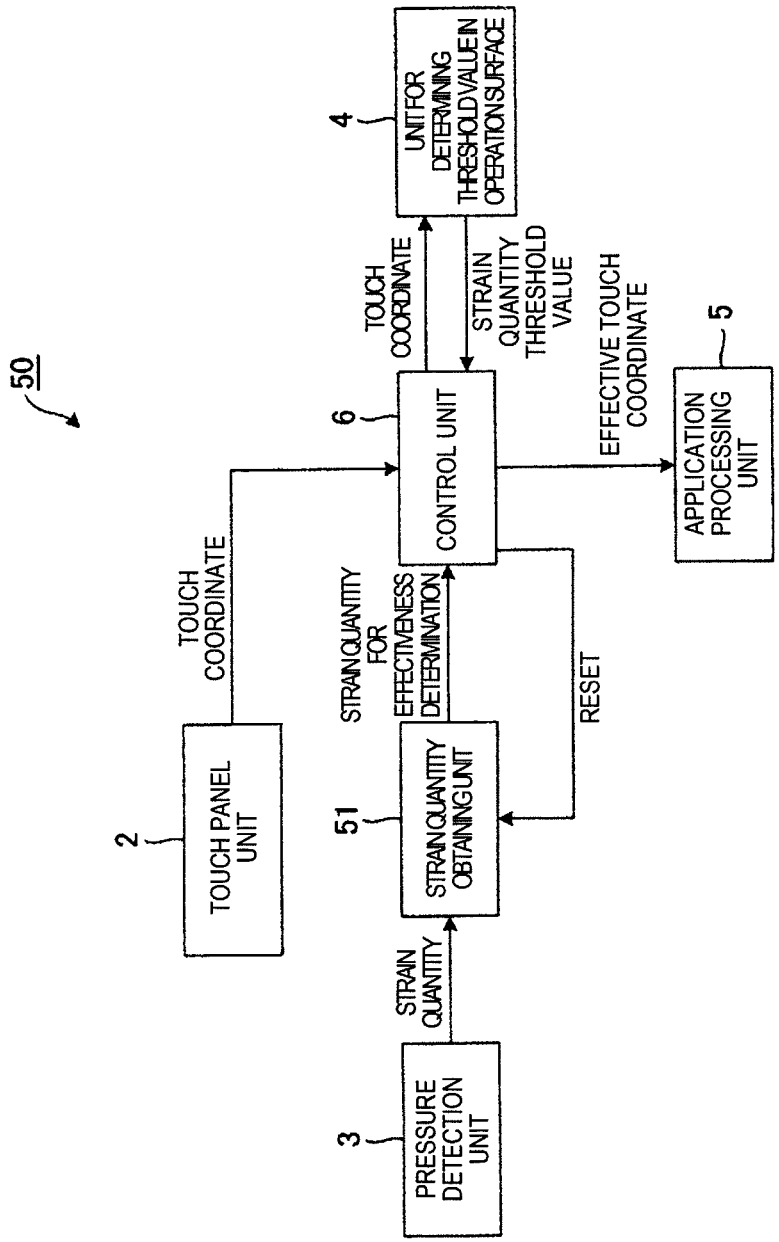
FIG. 8 is a block diagram illustrating a schematic configuration of an electronic apparatus according to Exemplary Embodiment 2 of the present invention.

FIG. 8 is a block diagram illustrating a schematic configuration of an electronic apparatus according to Exemplary Embodiment 2 of the present invention. In FIG. 8, components common as the above described components in FIG. 1 are denoted by the same reference numerals and descriptions thereof will be omitted. In electronic apparatus 50 according to Exemplary Embodiment 2, variation in strain quantity may be also accurately obtained when a variation time of a strain quantity is shorter than an obtaining interval (sampling interval) of a touch coordinate and strain quantity obtaining unit 51 is included as a unit for causing this to be possible.

Figure 9:
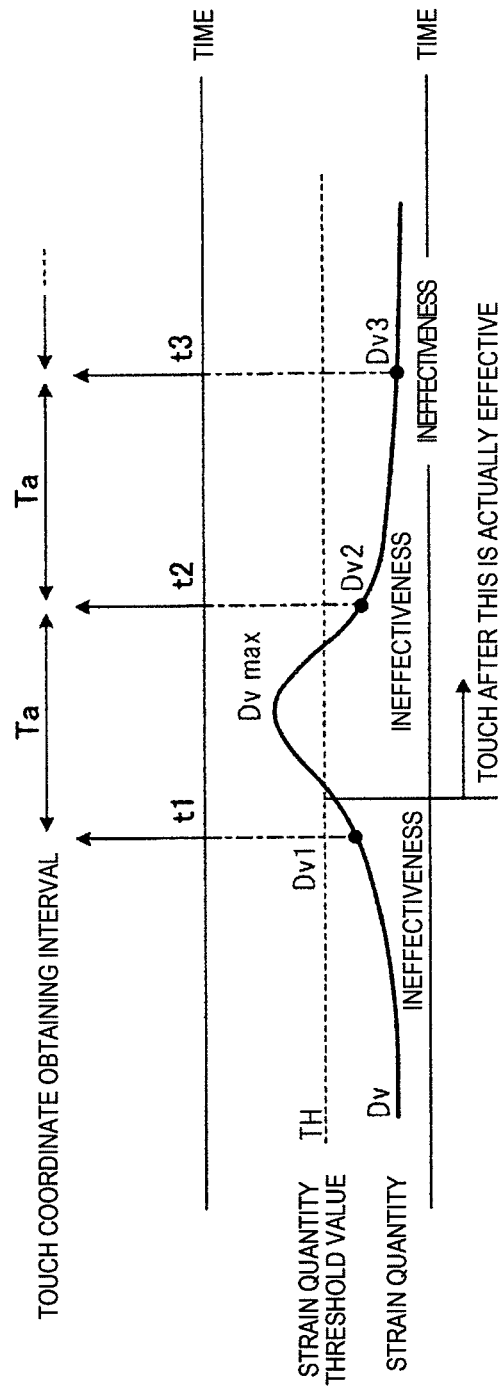
FIG. 9 is a diagram illustrating an example when a sampling interval for a two-dimensional coordinate is longer than a variation time of a strain quantity.

FIG. 9 is a diagram illustrating an example when a sampling interval Ta for a two-dimensional coordinate is longer than the variation time of a strain quantity. As illustrated in FIG. 9, the maximum value Dvmax of a strain quantity Dv obtained through the touch operation is within the sampling interval Ta of a two-dimensional coordinate and any one of strain quantities Dv1, Dv2, and Dv3 at timings t1, t2, and t3 of the two-dimensional coordinate is below strain quantity threshold value TH. Accordingly, the two-dimensional coordinate obtained through the touch operation at this time is not caused to be effective. As in this example, if variation in strain quantity may not be accurately obtained, a two-dimensional coordinate obtained through the touch operation is not caused to be effective though there is a touch operation. If being original, it is necessary that a two-dimensional coordinate obtained through a touch operation after strain quantity Dv exceeds strain quantity threshold value TH is effective. If there is attachment of water or the like, a two-dimensional coordinate obtained by water or the like may or may be not caused to be effective. However, if there is a touch operation performed by an instructing object such as a finger, it is necessary that a two-dimensional coordinate obtained by this is effective.

Figure 10:
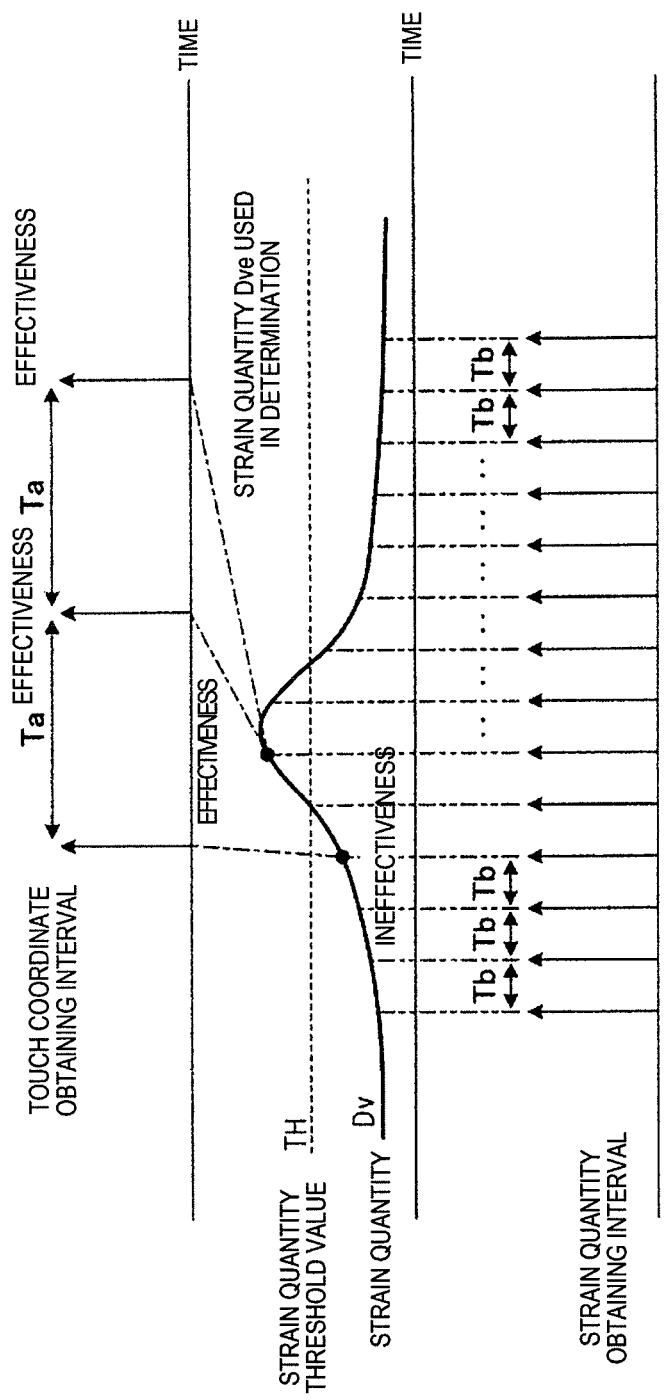
FIG. 10 is a diagram illustrating a strain quantity obtaining process for determination in the electronic apparatus according to Exemplary Embodiment 2.

FIG. 10 is a diagram illustrating a strain quantity obtaining process for determination in electronic apparatus 50 according to Exemplary Embodiment 2. As illustrated in FIG. 10, a strain quantity obtaining unit 51 obtains a strain quantity Dv at an interval (below referred to as a "strain quantity obtaining interval Tb") which is faster than variation in strain quantity Dv, stores the maximum value of strain quantity Dv, and outputs the maximum value of strain quantity Dv as strain quantity for effectiveness determination Dve to control unit 6. Strain quantity obtaining unit 51 obtains strain quantity Dv at the strain quantity obtaining interval Tb, compares the obtained strain quantity Dv with the right previously obtained strain quantity Dv, and thus obtains the maximum value of strain quantity Dv. Strain quantity obtaining unit 51 continues to output strain quantity for effectiveness determination Dve until reset is performed by control unit 6.

Control unit 6 obtains a touch coordinate output from touch panel unit 2 at a constant interval (sampling interval) Ta. Control unit 6 compares strain quantity for effectiveness determination Dve obtained by strain quantity obtaining unit 51 with strain quantity threshold value TH corresponding to the touch coordinate. If strain quantity for effectiveness determination Dve is larger than strain quantity threshold value TH, control unit 6 causes the touch coordinate at the current time to be effective. The touch coordinate caused to be effective is output as an effective touch coordinate to application processing unit 5.

Control unit 6 continuously causes the touch coordinate (particularly, two-dimensional coordinate) from output of touch panel unit 2 to be effective until a finger being an instructing object is separated from operation surface 40 of touch panel unit 2 by a predetermined distance or more in a perpendicular direction. If the finger being an instructing object is separated from operation surface 40 of touch panel unit 2 by the predetermined distance or more in the perpendicular direction, control unit 6 determines an operation performed on the effective touch coordinate to be released, stops output of the effective touch coordinate, and causes strain quantity obtaining unit 51 to be reset. Then, control unit 6 deletes the strain quantity for effectiveness determination Dve which is the maximum value of strain quantity Dv, stored in strain quantity obtaining unit 51.

When electronic apparatus 50 is operated by bringing an instructing object such as a finger into contact with touch panel unit 2 and causing a touch coordinate to be effective, large strain is detected in contact for the first time. However, then, when contact continues and an operation continues, the strain tends to decrease gradually. Particularly, this tendency appears significantly in a flicking operation and the like. In this exemplary embodiment, a touch coordinate is caused to be effective based on the strain and then is maintained to be effective until the instructing object is separated from touch panel unit 2. Thus, it is possible to suppress incorrect detection of the strain due to very small amount of water and to prevent determination of an actual operation such as a flicking operation to be ineffective by mistake.

Figure 11:
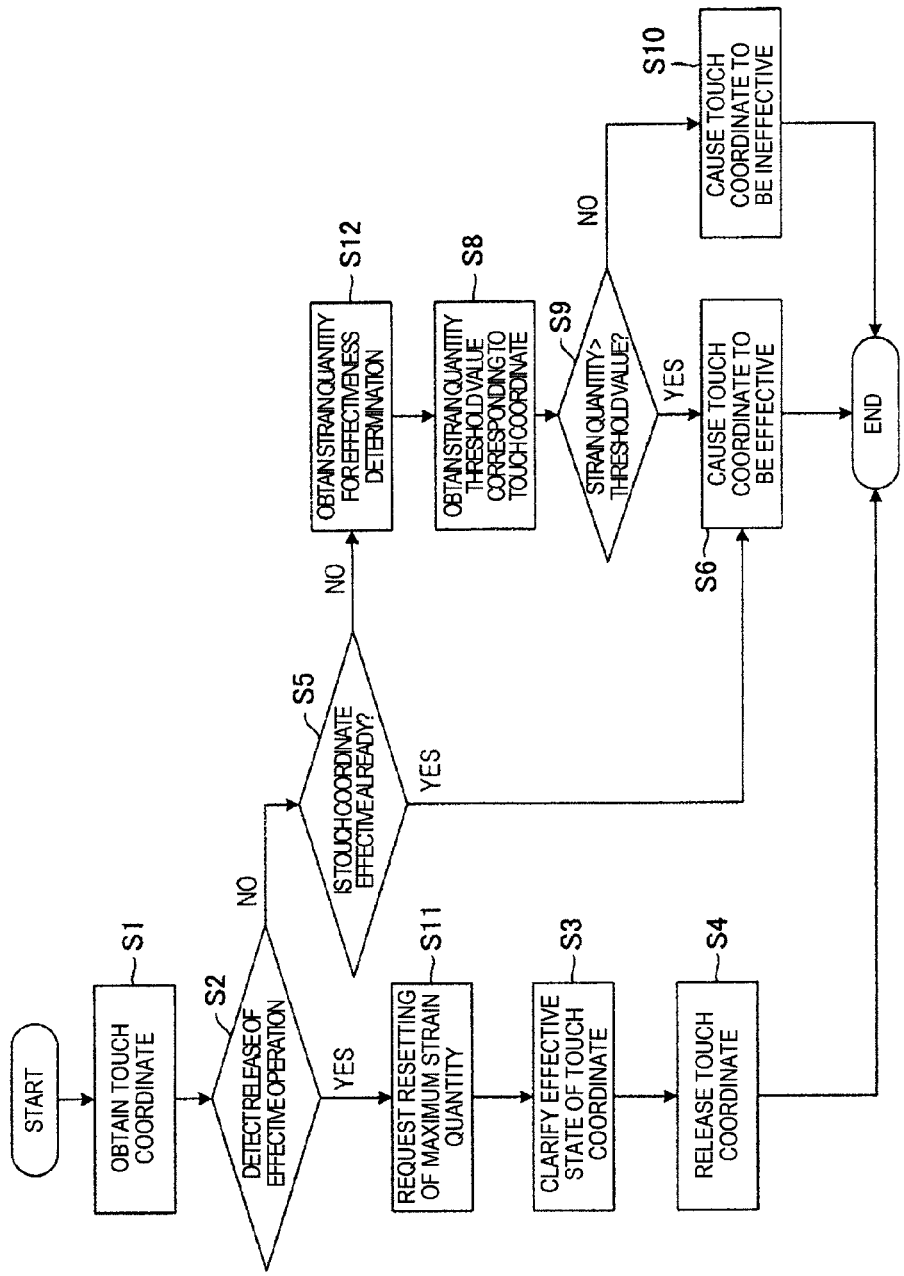
FIG. 11 is a flowchart illustrating an operation of a control unit of the electronic apparatus according to Exemplary Embodiment 2.

FIG. 11 is a flowchart illustrating an operation of control unit 6 of electronic apparatus 50 according to Exemplary Embodiment 2. In FIG. 11, processes common as the processes illustrated in FIG. 7 are denoted by the same reference numerals and detailed descriptions thereof will be omitted.

In FIG. 11, control unit 6 obtains a touch coordinate output from touch panel unit 2 (Step S1) and outputs the obtained touch coordinate to unit for determining threshold value in operation surface 4. Control unit 6 determines whether or not release of an effective operation can be detected, based on the obtained touch coordinate after the coordinate is output to unit for determining threshold value in operation surface 4 (Step S2). Control unit 6 outputs a request for resetting the maximum strain quantity, that is, the strain quantity for effectiveness determination Dve to strain quantity obtaining unit 51 when it is determined that release of the effective operation can be detected (when there is determination of YES in Step S2) (Step S11). That is, deletion of strain quantity for effectiveness determination Dve which is stored in strain quantity obtaining unit 51 is required. An effective state of the touch coordinate is caused to be clear after the request for resetting strain quantity for effectiveness determination Dve is output to strain quantity obtaining unit 51 (Step S3). Then, the touch coordinate is released (Step S4) and the process is ended.

In the determination of Step S2, control unit 6 determines whether or not the touch coordinate is already effective when it is determined that it is difficult to detect release of the effective operation (when there is determination of NO in Step S2) (Step S5). That is, control unit 6 determines whether or not a state where a finger comes into contact with operation surface 40 of touch panel unit 2 continues. In this determination, when it is determined that the touch coordinate is already effective (when there is determination of YES in Step S5), that is, when it is determined that the state where a finger comes into contact with operation surface 40 continues, the touch coordinate is caused to be effective (Step S6) and the process is ended.

A strain quantity for effectiveness determination Dve is obtained from strain quantity obtaining unit 51 when it is determined that the touch coordinate is not effective (when there is determination of NO in Step S5) (Step S12). Then, control unit 6 obtains strain quantity threshold value TH corresponding to the touch coordinate from unit for determining threshold value in operation surface 4 (Step S8). Strain quantity for effectiveness determination Dye is obtained and strain quantity threshold value TH corresponding to the touch coordinate is obtained, and then obtained strain quantity Dv and strain quantity threshold value TH are compared (Step S9). When it is determined that strain quantity for effectiveness determination Dve is larger than strain quantity threshold value TH in this comparison (when there is determination of YES in Step S9), the touch coordinate is caused to be effective (Step S6) and the process is ended. On the other hand, when it is determined that strain quantity for effectiveness determination Dve is equal to or less than strain quantity threshold value TH (when there is determination of NO in Step S9), the touch coordinate is caused to be ineffective (Step S10) and the process is ended. The above processes (Steps S1 to S6 and Steps S8 to S12) are executed whenever a touch coordinate is obtained.

Figure 12:
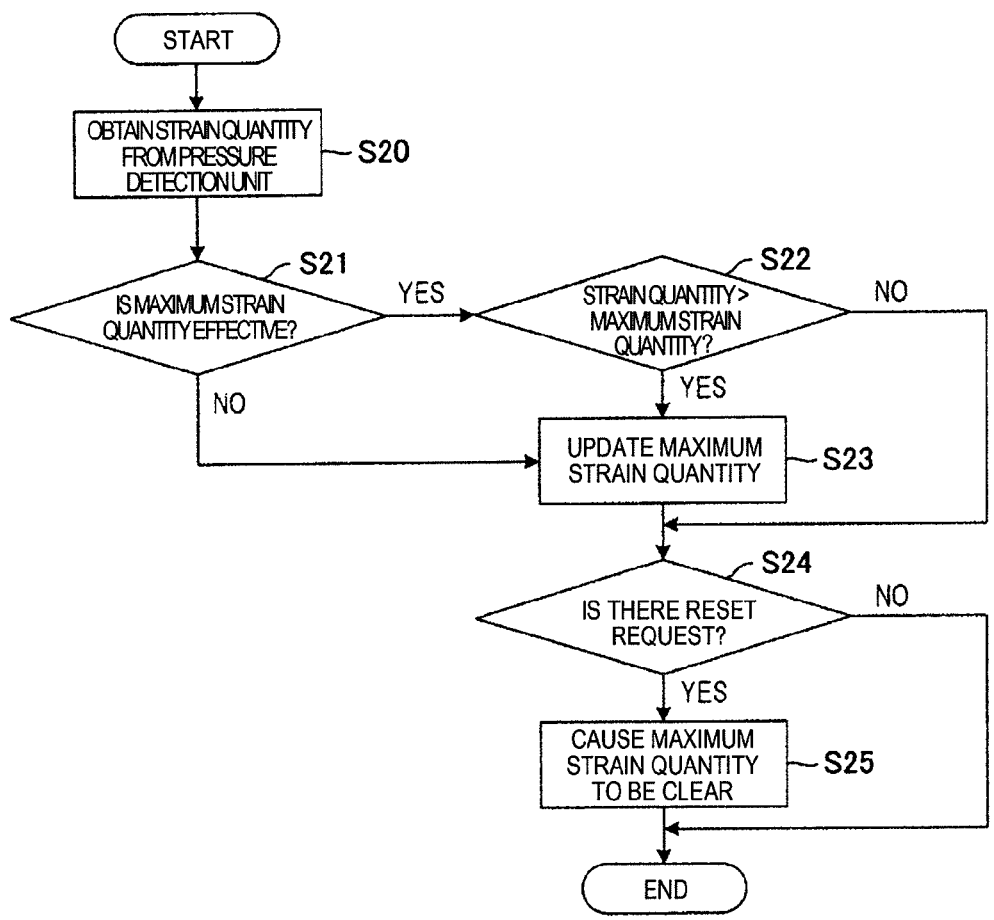
FIG. 12 is a flowchart illustrating an operation of a strain quantity obtaining unit of the electronic apparatus according to Exemplary Embodiment 2.

FIG. 12 is a flowchart illustrating an operation of strain quantity obtaining unit 51 of electronic apparatus 50 according to Exemplary Embodiment 2. In FIG. 12, strain quantity obtaining unit 51 obtains a strain quantity output from pressure detection unit 3 (Step S20). It is determined whether or not the maximum strain quantity (strain quantity for effectiveness determination Dve) is effective (Step S21). When it is determined that the maximum strain quantity is effective (when there is determination of YES in Step S21), it is determined whether or not a strain quantity obtained at the current time is larger than the maximum strain quantity (Step S22). In this determination, when it is determined that the strain quantity obtained at the current time is larger than the maximum strain quantity (when there is determination of YES in Step S22), the maximum strain quantity is updated (Step S23). That is, update of the strain quantity obtained at the current time being set as the maximum strain quantity is performed.

In the determination of Step S21, when it is determined that the maximum strain quantity is not effective (when there is determination of NO in Step S21), the maximum strain quantity is updated (Step S23). After the maximum strain quantity is updated, it is determined whether or not a reset request is received from control unit 6 (Step S24). When it is determined that the reset request is received (when there is determination of YES in Step S24), the maximum strain quantity which is stored currently is caused to be clear (Step S25) and the process is ended. When it is determined that the reset request is not received in the determination of Step S24 (when there is determination of NO in Step S24), the process is ended with no process being performed. The above processes (Steps S20 to S25) are executed at a predetermined time interval.

With such electronic apparatus 50 according to Exemplary Embodiment 2, since strain quantity obtaining unit 51 that obtains a strain quantity at an interval which is faster than variation in strain to be detected and stores the maximum value of the strain quantity is included, a touch operation causing a little variation in strain quantity is caused to be effective and thus it is possible to prevent determination of an actual operation to be ineffective by mistake. That is, when a touch coordinate is obtained at a predetermined sampling interval, if a strain quantity at a time when the touch coordinate is obtained does not exceed the strain quantity threshold value (that is, when a predetermined condition is not satisfied), the touch coordinate at that time is not caused to be effective. With this, it is possible to prevent a touch coordinate obtained by attachment of water or the like from being caused to be effective. When a strain quantity at a time when a touch coordinate is obtained exceeds the strain quantity threshold value for the sampling interval for obtaining the touch coordinate (that is, when the predetermined condition is satisfied), the touch coordinate at that time is caused to be effective. With this, it is possible to cause a two-dimensional coordinate obtained through a touch operation performed by an instructing object such as a finger to be effective. If the touch coordinate is caused to be effective once, the touch coordinate is effective continuously until the instructing object such as a finger is separated from operation surface 40 of touch panel unit 2 in the perpendicular direction by the predetermined distance or more. Accordingly, it is possible to prevent a touch coordinate from being caused to be ineffective when an operation in which a large strain quantity occurring due to a flicking operation and the like is not secured is performed.

Exemplary Embodiment 3

Electronic apparatus 60 according to Exemplary Embodiment 3 of the present invention includes a unit that can prevent determination of a touch coordinate obtained by a touch which is not an operation to be effective by mistake, and the touch is one of multi-touch detected by touch panel unit 2. An example of a case where touch panel unit 2 detects simultaneously a plurality of touch coordinates includes a case where one touch coordinate is obtained through an operation of a finger and the remaining touch coordinates are obtained by water. As illustrated in FIG. 13A, when water 90 is in the vicinity of the end of operation surface 40 and an operation is performed in the vicinity of the center of operation surface 40 with finger 91, water 90 and finger 91 are brought onto contact with operation surface 40 and thus touch coordinates corresponding to water 90 and finger 91 are output from touch panel unit 2.

Since finger 91 is at the center portion of operation surface 40 and water 90 is at the end of operation surface 40, a strain quantity threshold value is set to be a small value which corresponds to the water. That is, as illustrated in FIG. 13B, a strain quantity threshold value TH1 for water 90 is set to be small and strain quantity threshold value TH2 for finger 91 is set to be large. Since a strain quantity exceeds strain quantity threshold value TH1 at a portion at which there is water 90, incorrect detection due to water 90 is caused to be effective earlier. That is, a touch coordinate obtained by water 90 is caused to be effective at a touch coordinate obtaining time point t2. However, it is desired to cause a touch coordinate which is obtained by finger 91 at a touch coordinate obtaining time point t3 to be effective earlier.

As countermeasures for solving this problem, the following method is considered.

A strain quantity being increasing is considered as that an operation is in the process of being performed and determination of being effective is not performed.

Determination of being effective is performed on a touch coordinate after variation in the strain quantity is determined to be stable.

Variation in the strain quantity in accordance with a touch operation is detected in a flow of increase, stagnation, and decrease and thus being increasing is considered as an operation is in the process of being performed and determination of being effective is not performed.

Proposed scheme for determining to be stable

A case where increase of the strain quantity is equal to or less than the predetermined threshold value (threshold value for determining increase of the strain quantity)

A case where a case where increase of the strain quantity is equal to or less than the predetermined threshold value (threshold value for determining increase of the strain quantity) is performed a predetermined number of times A case where it is detected that the strain quantity varies no longer or a case where decrease in the strain quantity is detected for the first time A case where no variation in the strain quantity occurs and then the strain quantity does not increase continuously a predetermined number of times or a case where no decrease in the strain quantity is detected and then the strain quantity does not increase continuously a predetermined number of times A case where the strain quantity is in a predetermined range for a predetermined time after the strain quantity exceeds the predetermined threshold value (threshold value for ignoring an electrical noise and the like)

Selection method when a plurality of coordinates exceed the threshold value simultaneously at a timing of determination select a coordinate obtained by detecting a touch which is performed later select a coordinate having a large threshold value Because of that the great strain is detected at the center portion easier than being detected at the end Plans exemplified below are included when threshold values corresponding to touch coordinates are the same as each other.

all of the touch coordinates are effective the touch coordinate obtained by performing touching later is effective the touch coordinate which is closed to the center portion is effective A case where "selection of a coordinate obtained by detecting a touch which is performed later" is performed will be described with reference to the drawings.

Figure 14:
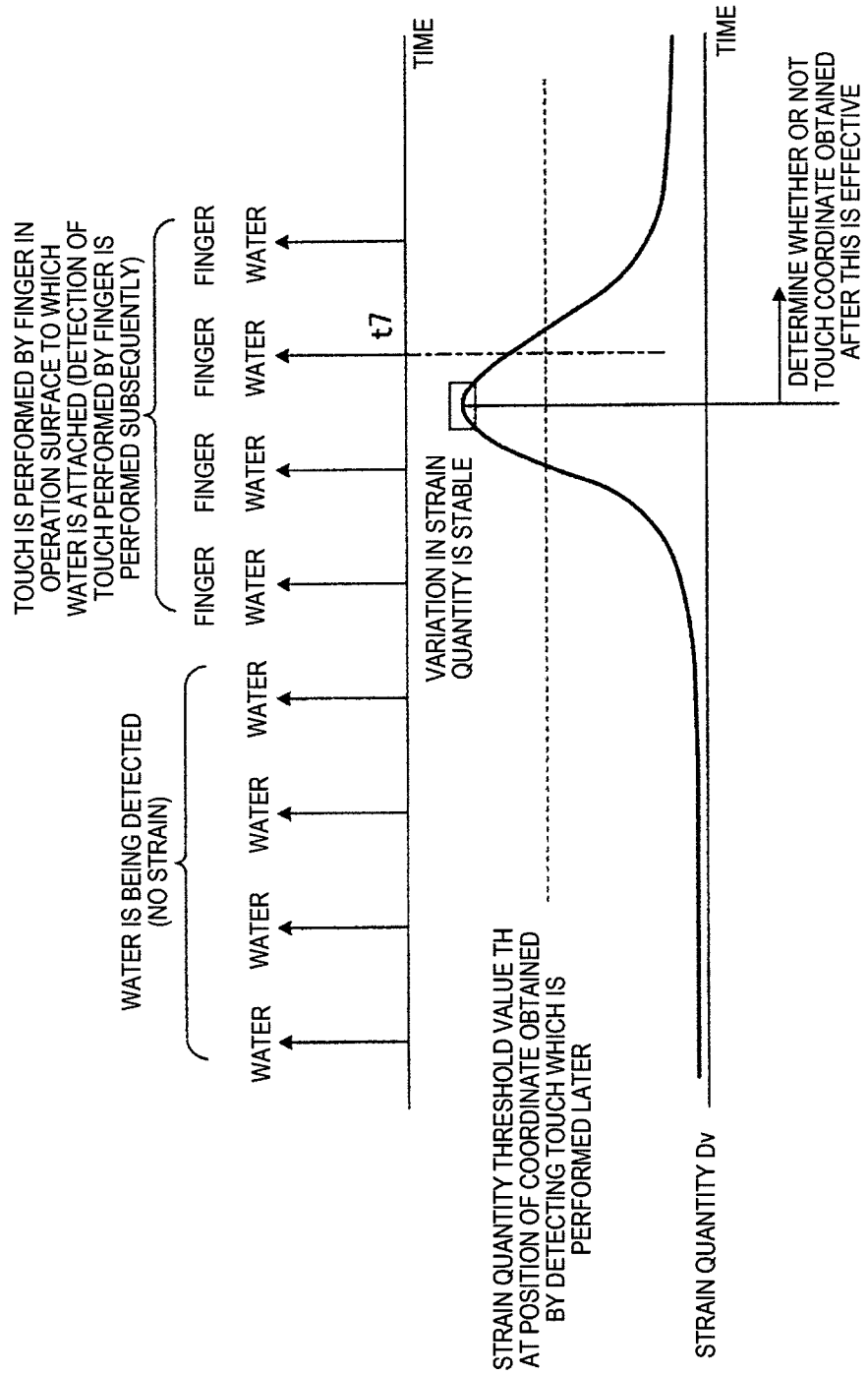
FIG. 14 is a diagram illustrating a function when the electronic apparatus according to Exemplary Embodiment 3 has the function of "selecting a coordinate obtained by detecting a touch which is performed later"

FIG. 14 is a diagram illustrating a function when electronic apparatus 60 according to Exemplary Embodiment 3 has the function of "selecting a coordinate obtained by detecting a touch which is performed later". This function will be described with reference to FIGS. 13A and 13B together. The example illustrated in FIG. 14 corresponds to an example in which if water 90 is attached to operation surface 40 before operation surface 40 of touch panel unit 2 is operated with finger 91, a touch coordinate corresponding to finger 91 which is detected subsequent to detection of water 90 is selected. Since water 90 itself is not recognized, it is not confirmed whether water 90 is brought onto contact with operation surface 40. However, in this example, it is assumed that water 90 is brought onto contact with operation surface 40.

Water 90 is attached to operation surface 40 of touch panel unit 2 and thus a touch coordinate corresponding to a position at which water 90 is attached is output from touch panel unit 2. The touch coordinate output from touch panel unit 2 is input to control unit 6 at a touch coordinate obtaining timing. A strain quantity which is detected by pressure detection unit 3 when water 90 is attached to operation surface 40 is smaller than strain quantity threshold value TH. Thus, the strain quantity does not exceed strain quantity threshold value TH. As described above, strain quantity threshold value TH is set to a value larger than the strain quantity detected when water 90 is attached to operation surface 40 such that the touch coordinate obtained by attachment of water 90 is not caused to be effective.

If finger 91 touches operation surface 40 after water 90 is attached to operation surface 40 of touch panel unit 2, a touch coordinate corresponding to a position at which finger 91 comes onto contact with operation surface 40 is output from touch panel unit 2. Strain quantity Dv output from pressure detection unit 3 increases gradually and when strain quantity Dv reaches the maximum value, variation in strain quantity Dv becomes stable. It is determined whether or not the touch coordinate is effective, from a time when the variation in strain quantity Dv is stable. Strain quantity Dv is compared with strain quantity threshold value (strain quantity threshold value corresponding to the coordinate of a position at which a touch occurs by a finger) TH at a touch coordinate obtaining timing t7 after the variation in strain quantity Dv is stable. At this time, if strain quantity Dv exceeds strain quantity threshold value TH, the touch coordinate corresponding to a position at which finger 91 comes onto contact with operation surface 40 becomes effective. In this manner, if the variation in strain quantity Dv is stable and exceeds strain quantity threshold value TH, a touch coordinate at that time becomes effective.

Figure 15:
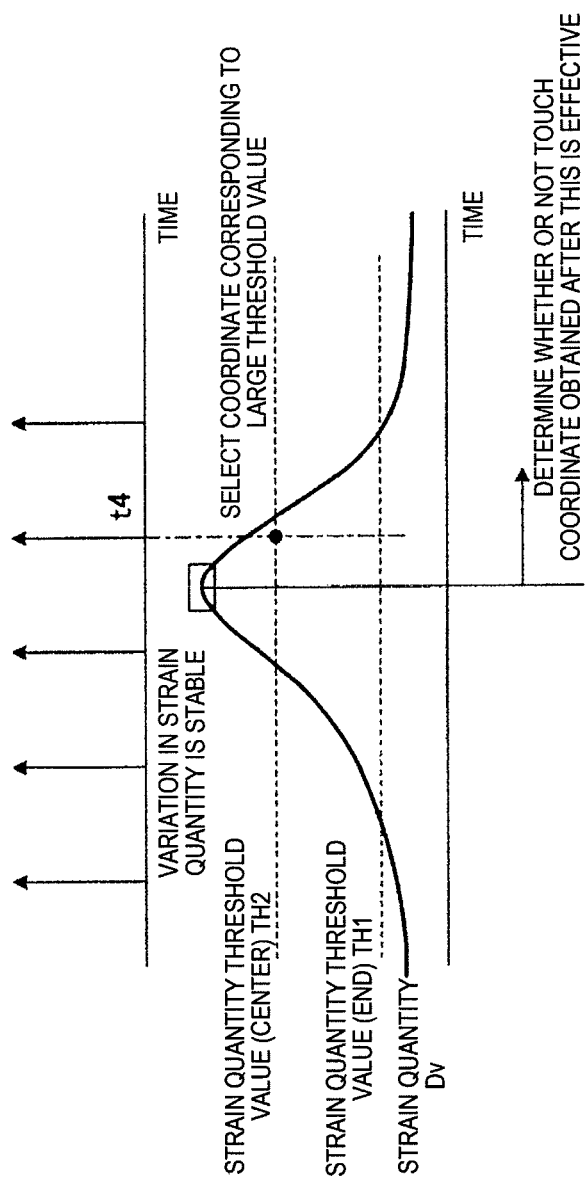
FIG. 15 is a diagram illustrating a function when the electronic apparatus according to Exemplary Embodiment 3 has the function of "selecting a coordinate corresponding to a large threshold value"

FIG. 15 is a diagram illustrating a function when electronic apparatus 60 according to Exemplary Embodiment 3 has the function of "selecting a coordinate corresponding to a large threshold value". In FIG. 15, strain quantity Dv increases gradually and when strain quantity Dv reaches the maximum value, variation in strain quantity Dv becomes stable. It is determined whether or not touch coordinates are effective, from a time when the variation in strain quantity Dv is stable. The touch coordinate corresponding to a large one of strain quantity threshold values TH1 and TH2 is selected at a touch coordinate obtaining timing t4 after the variation in strain quantity Dv is stable. In this case, strain quantity threshold value TH2 corresponding to the position at which a touch occurs by finger 91 is larger than strain quantity threshold value TH1 corresponding to the position at which water 90 is attached to operation surface 40 and thus the touch coordinate corresponding to the position at which finger 91 comes into contact with operation surface 40 becomes effective. In this manner, the variation in strain quantity Dv is stable and then the touch coordinate corresponding to the large strain quantity threshold value is selected and the touch coordinate at that time becomes effective.

Figure 16:
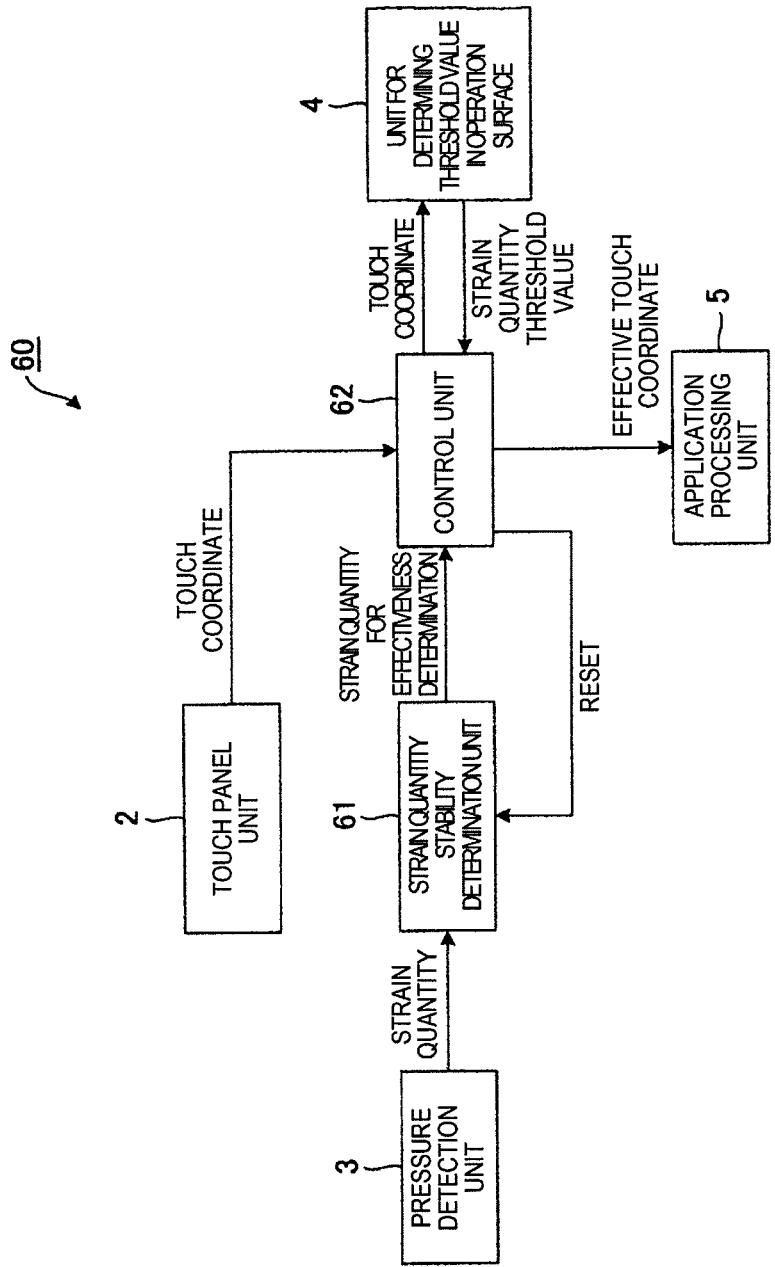
FIG. 16 is a block diagram illustrating a schematic configuration of the electronic apparatus according to Exemplary Embodiment 3.

FIG. 16 is a block diagram illustrating a schematic configuration of electronic apparatus 60 according to Exemplary Embodiment 3. In FIG. 16, components common as the above described components in FIG. 1 are denoted by the same reference numerals and descriptions thereof will be omitted. Electronic apparatus 60 according to Exemplary Embodiment 3 may prevent determination of a touch coordinate which is not obtained by an operation to be effective by mistake also when touch panel unit 2 detects multi-touch at portions on operation surface 40 of touch panel unit 2, which have different strain quantity threshold values from each other, as descried above. Electronic apparatus 60 includes strain quantity stability determination unit 61 as a unit for allowing determination by mistake to be prevented.

Strain quantity stability determination unit 61 outputs the strain quantity as the strain quantity for effectiveness determination to control unit 62 after variation in the strain quantity output from pressure detection unit 3 is stable. Unit for determining threshold value in operation surface 4 outputs strain quantity threshold values corresponding to a plurality of touch coordinates to control unit 62. For example, unit for determining threshold value in operation surface 4 outputs a strain quantity threshold value corresponding to a touch coordinate obtained by water 90 and a strain quantity threshold value corresponding to a touch coordinate obtained by finger 91 to control unit 62. When control unit 62 has the function of "selecting a coordinate obtained by detecting a touch which is performed later", control unit 62 selects the strain quantity threshold value corresponding to the touch coordinate obtained by finger 91. Then, control unit 62 compares the selected strain quantity threshold value with the strain quantity for effectiveness determination obtained by strain quantity stability determination unit 61. When the strain quantity for effectiveness determination is larger than the selected strain quantity threshold value, control unit 62 causes the touch coordinate obtained by finger 91 to be effective and outputs the touch coordinate as an effective touch coordinate to application processing unit 5.

When control unit 62 has the function of "selecting a coordinate corresponding to a large threshold value", control unit 62 selects the strain quantity threshold value corresponding to the touch coordinate obtained by finger 91. Then, control unit 62 compares the selected strain quantity threshold value with the strain quantity for effectiveness determination obtained by strain quantity stability determination unit 61. When the strain quantity for effectiveness determination is larger than the selected strain quantity threshold value, control unit 62 causes the touch coordinate obtained by finger 91 to be effective and outputs the touch coordinate as an effective touch coordinate to application processing unit 5. After then, touch coordinates becomes effective continuously until an operation is not performed (that is, until a finger is released from operation surface 40 of touch panel unit 2). If an operation is not performed (that is, if a finger is released from operation surface 40 of touch panel unit 2), control unit 62 controls strain quantity stability determination unit 61 to be reset and stops outputting the effective touch coordinate.

Figure 17:
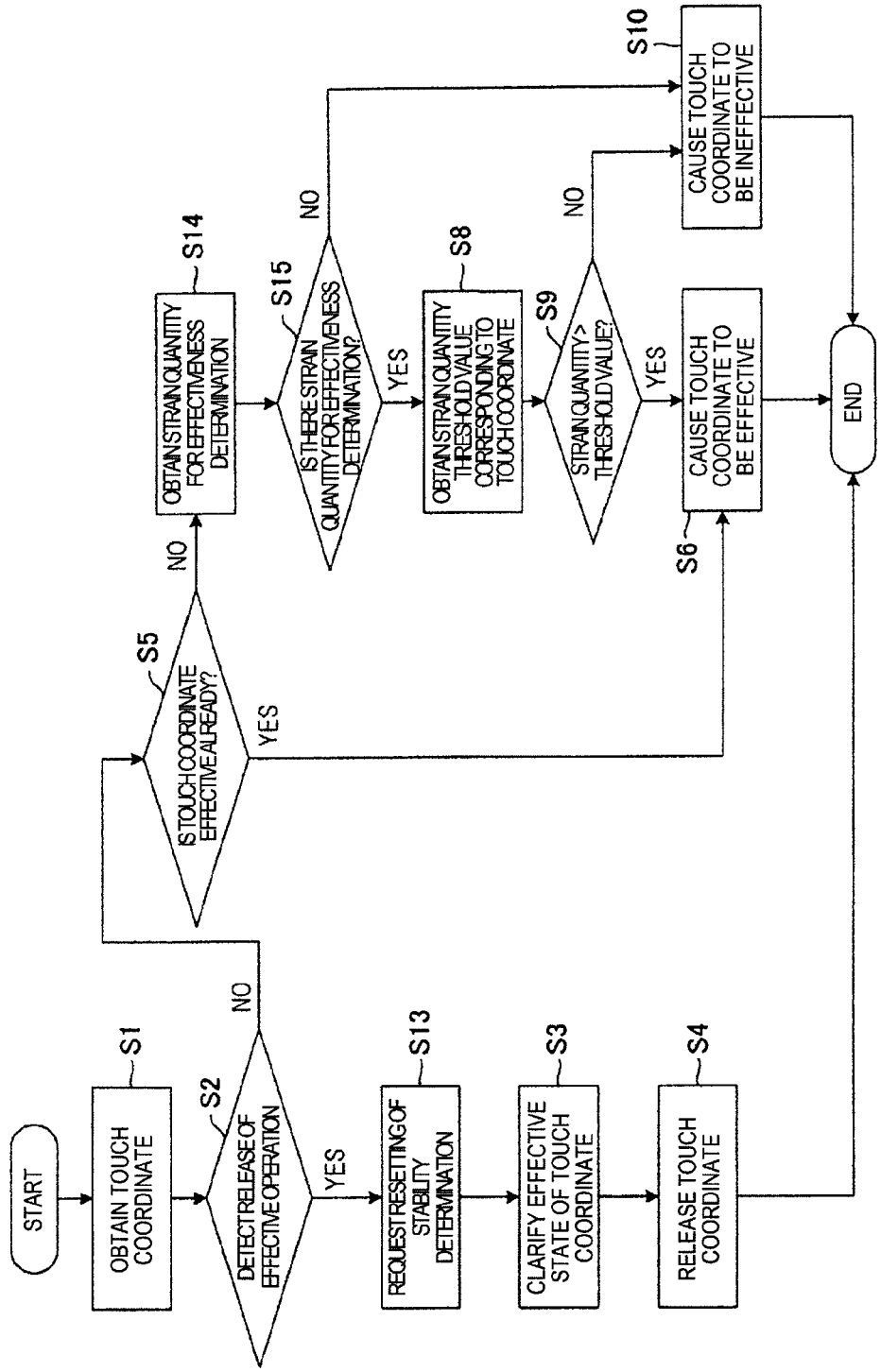
FIG. 17 is a flowchart illustrating an operation of a control unit of the electronic apparatus according to Exemplary Embodiment 3.

FIG. 17 is a flowchart illustrating an operation of control unit 62 of electronic apparatus 60 according to Exemplary Embodiment 3. In FIG. 17, processes common as the processes illustrated in FIG. 7 are denoted by the same reference numerals and detailed descriptions thereof will be omitted.

In FIG. 17, control unit 62 obtains a touch coordinate output from touch panel unit 2 (Step S1) and outputs the obtained touch coordinate to unit for determining threshold value in operation surface 4. Control unit 6 determines whether or not release of an effective operation can be detected, based on the obtained touch coordinate after the coordinate is output to unit for determining threshold value in operation surface 4 (Step S2). Control unit 6 outputs a request for resetting stability determination to strain quantity stability determination unit 61 when it is determined that release of the effective operation can be detected (when there is determination of YES in Step S2) (Step S13). Control unit 6 causes an effective state of the touch coordinate to be clear after the request for resetting stability determination is output to strain quantity stability determination unit 61 (Step S3). Then, the touch coordinate is released (Step S4) and the process is ended.

In the determination of Step S2, control unit 6 determines whether or not the touch coordinate is already effective when it is determined that it is difficult to detect release of the effective operation (when there is determination of NO in Step S2) (Step S5). In this determination, when it is determined that the touch coordinate is already effective (when there is determination of YES in Step S5), the touch coordinate is caused to be effective (Step S6) and the process is ended. When a plurality of touch coordinates exceed the threshold value simultaneously in Step S6, selection is performed. For example, the coordinate obtained by detecting a touch which is performed later is selected or the coordinate corresponding to a large strain quantity threshold value is selected.

Control unit 6 obtains a strain correction quantity for effectiveness determination output from strain quantity stability determination unit 61 when it is determined that the touch coordinate is not effective (when there is determination of NO in Step S5) (Step S14). Control unit 6 determines whether or not there is the strain quantity for effectiveness determination (Step S15). Control unit 6 obtains the strain quantity threshold value corresponding to the touch coordinate from unit for determining threshold value in operation surface 4 when it is determined that there is the strain quantity for effectiveness determination (when there is determination of YES in Step S15), that is, when it is determined that the variation in the strain quantity is stable (Step S8).

Control unit 6 obtains the strain quantity for effectiveness determination and obtains the strain quantity threshold value corresponding to the touch coordinate and then compares the obtained strain quantity for effectiveness determination with the obtained strain quantity threshold value (Step S9). When it is determined that the strain quantity for effectiveness determination is larger than the strain quantity threshold value (when there is determination of YES in Step S9), control unit 6 causes the touch coordinate to be effective (Step S6) and the process is ended. On the other hand, when it is determined that the strain quantity for effectiveness determination is equal to or less than the strain quantity threshold value (when there is determination of NO in Step S9), control unit 6 causes the touch coordinate to be ineffective (Step S10) and the process is ended.

In the determination of Step S15, when it is determined that there is no strain quantity for effectiveness determination (when there is determination of NO in Step S15), that is, when it is determined that the strain quantity is increasing or that the variation in the strain quantity is unstable, control unit 6 causes the touch coordinate to be ineffective (Step S10) and the process is ended. The above processes (Steps S1 to S6, Steps S8 to S10, and Steps S13 to S15) are executed whenever a touch coordinate is obtained.

Figure 18:
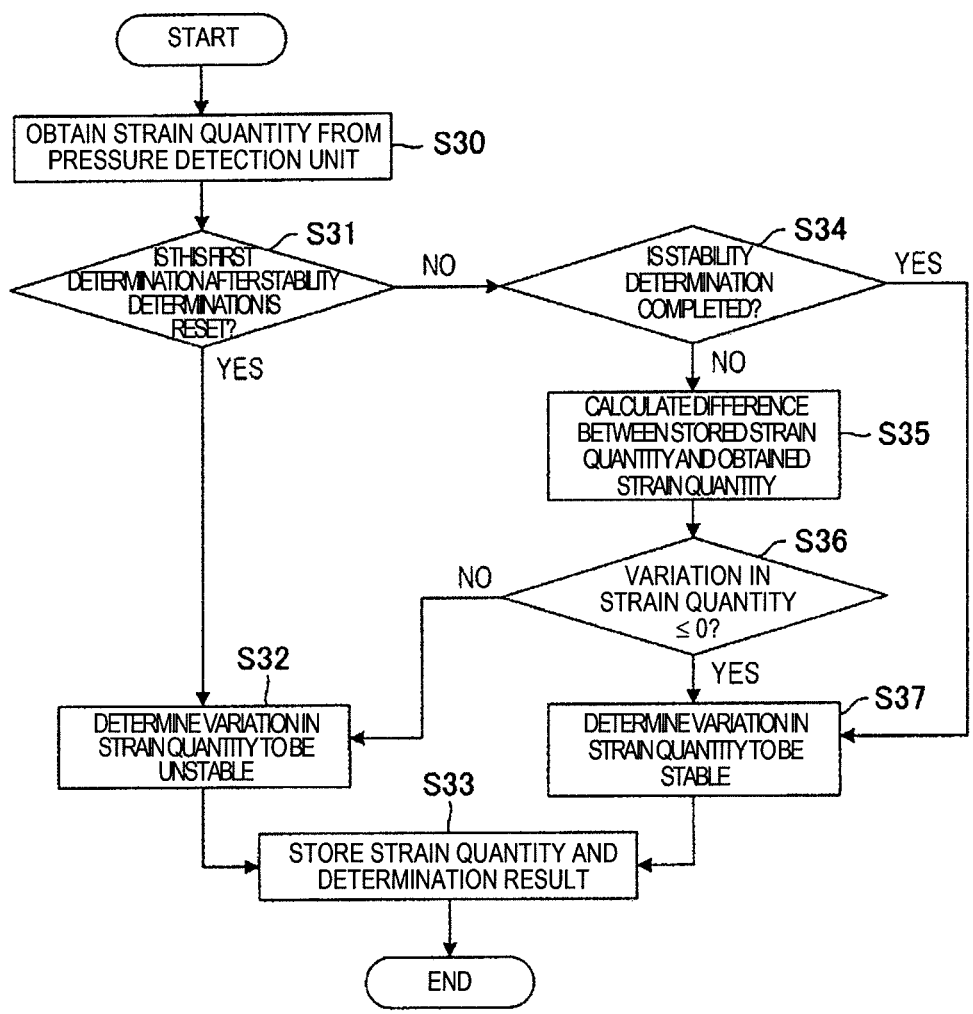
FIG. 18 is a flowchart illustrating an operation of a strain quantity stability determination unit of the electronic apparatus according to Exemplary Embodiment 3.

FIG. 18 is a flowchart illustrating an operation of strain quantity stability determination unit 61 of electronic apparatus 60 according to Exemplary Embodiment 3. In FIG. 18, strain quantity stability determination unit 61 determines a case to be stable and the case includes a case where the strain quantity varies no longer or a case where reduction of the variation in the strain quantity is detected for the first time. Strain quantity stability determination unit 61 obtains a strain quantity output from pressure detection unit 3 (Step S30). Strain quantity stability determination unit 61 determines whether or not stability determination is being performed first time after the stability determination is reset (Step S31). When it is determined that stability determination is being performed first time after the stability determination is reset (when there is determination of YES in Step S31), strain quantity stability determination unit 61 determines the strain quantity to be unstable (Step S32). This is because this stability determination is performed for the first time and thus the strain quantity is unstable obviously. Strain quantity stability determination unit 61 stores the current strain quantity and the determination result (Step S33) and the process is ended.

In the determination of Step S31, when it is determined that stability determination is not being performed first time after the stability determination is reset (when there is determination of NO in Step S31), strain quantity stability determination unit 61 determines whether or not stability determination is completed (Step S34). When it is determined that stability determination is completed (when there is determination of YES in Step S34), strain quantity stability determination unit 61 determines the strain quantity to be stable (Step S37) and stores the current strain quantity and the determination result (Step S33), and the process is ended. In the determination of Step S34, when it is determined that stability determination is not completed (when there is determination of NO in Step S34), strain quantity stability determination unit 61 calculates a difference between the stored strain quantity and the current strain quantity (Step S35).

After the difference is calculated, strain quantity stability determination unit 61 determines whether or not the variation in the strain quantity is equivalent to a value equal to or less than 0 (zero) (Step S36). That is, strain quantity stability determination unit 61 determines whether there is no variation in the strain quantity or whether or not the strain quantity varies so as to be reduced. When it is determined that the variation in the strain quantity is equivalent to a value more than 0 (zero) (when there is determination of NO in Step S36), that is, when it is determined that the strain quantity varies, strain quantity stability determination unit 61 proceeds to Step S32 and determines the strain quantity to be unstable. On the other hand, when it is determined that the variation in the strain quantity is equivalent to a value equal to or less than 0 (zero) (when there is determination of YES in Step S36), strain quantity stability determination unit 61 determines the strain quantity to be stable (Step S37) and outputs the strain quantity as the strain quantity for effectiveness determination to control unit 62. Then, strain quantity stability determination unit 61 stores the current strain quantity and the determination result in Step S33 and the process is ended.

With such electronic apparatus 60 according to Exemplary Embodiment 3, it is possible to prevent determination of a touch coordinate which is not obtained by an operation to be effective by mistake when touch panel unit 2 detects multi-touch at the portions having different strain quantity threshold values from each other.

Exemplary Embodiment 4

Figure 19:
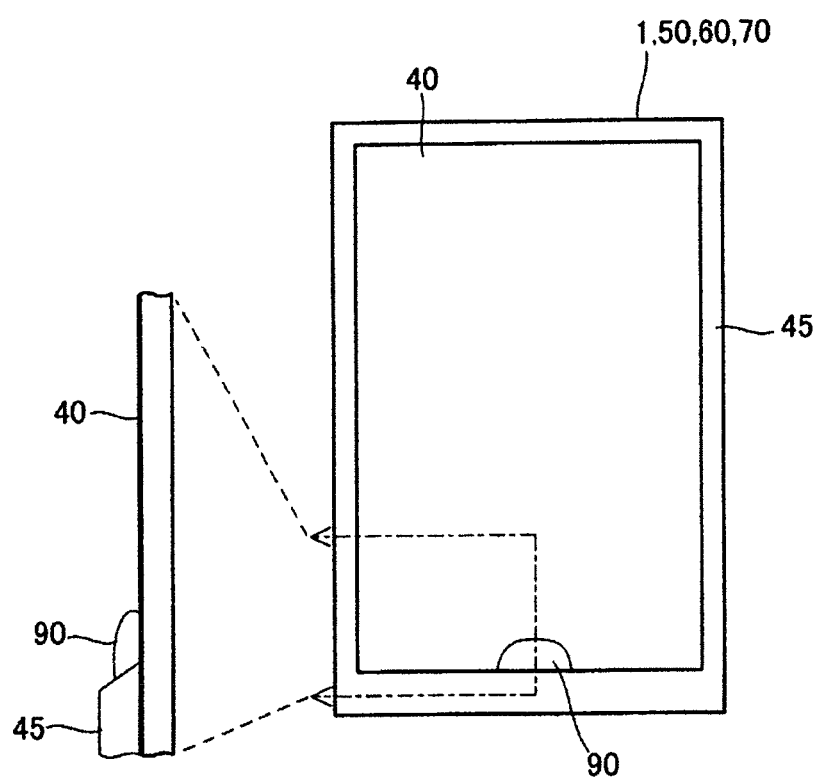
FIG. 19 is a view of the appearance on a front surface side of an electronic apparatus according to Exemplary Embodiment 4 of the present invention and an enlarged view of a cross-section of a part of the appearance.

FIG. 19 is a view of an appearance on a front surface side of electronic apparatus 70 according to Exemplary Embodiment 4 of the present invention and an enlarged view of a cross-section of a part of the appearance. In other electronic apparatuses in addition to electronic apparatus 70 according to Exemplary Embodiment 4, if a level difference is in the vicinity of a boundary between the inside and the outside of an operation surface due to a structure of a casing, water is likely to be collected. Thus, water may be detected normally when the water is attached to operation surface 40. In electronic apparatus 70 according to Exemplary Embodiment 4, the structure of the casing remains as it is and incorrect detection is not performed when water 90 is collected in the vicinity of a boundary between bezel 45 and operation surface 40.

In electronic apparatus 70 according to Exemplary Embodiment 4, a strain quantity threshold value at only an end portion of operation surface 40 is set to a value for no response in a normal operation. FIG. 20 is a diagram illustrating an example of strain quantity threshold value TH in electronic apparatus 70 according to Exemplary Embodiment 4. As illustrated in FIG. 20, strain quantity threshold value TH is set to a large value ("500") at only a peripheral portion. In this manner, a strain quantity does not exceed the strain threshold value in an operation performed in the vicinity of an installation position of pressure detection unit 3 which is able to detect a large strain quantity and thus water 90 which is collected at the end is not determined to be an effective operation.

If an area of a portion corresponding to the end is wide, it is difficult to perform an operation at the end. Accordingly, the following methods may be applied.

make an area obtained by performing division small.

divide an area at only the end into small areas.

If a portion at which incorrect detection is likely to be performed is limited to a lower end, a threshold value corresponding to the vicinity of the lower end may be changed.

An area at only the end may be divided into small areas in order to increase the number of detection areas without greatly increasing the number of subdivisions.

A threshold value corresponding to only the lower end in accordance with a direction of a terminal may be dynamically changed.

A program describing the processes which are illustrated in the flowcharts (FIG. 7, FIG. 11, FIG. 12, FIG. 17, and FIG. 18) of Exemplary Embodiments 1 to 3 is stored in a ROM of each of control units 6 and 62. However, the program may be stored in a storage medium such as a magnetic disk, an optical disk, a magneto-optical disk, a flash memory and be distributed or may be stored in a server (not illustrated) over a network such as the Internet and be downloaded by using an electric telecommunication line.

Each of electronic apparatuses 1, 50, 60, and 70 according to Exemplary Embodiments 1 to 4 is applied to a portable wireless device called as a smartphone. However, it is not limited to the portable wireless device and may be applied to home appliances such as a microwave oven, a control panel of a navigation system and the like in a car or the like.

Electronic apparatuses 1, 50, 60, and 70 according to Exemplary Embodiments 1 to 4 may be understood as follows.

Each of electronic apparatuses 1, 50, 60, and 70 includes a casing, a display unit that is disposed in the casing and displays predetermined information, an electrostatic capacitive touch panel unit through which display of the display unit passes and that determines a two-dimensional coordinate indicated by an instructing object which has some conductivity, a transparent member that is disposed to be stacked on the touch panel unit and through which display of the display unit passes, and a pressure detection unit that detects strain of the transparent member. In each of electronic apparatuses 1, 50, 60, and 70, when strain detected by the pressure detection unit is larger than a predetermined threshold value, a two-dimensional coordinate determined by the touch panel unit is caused to be effective and the predetermined threshold value varies in accordance with a location of the touch panel unit.

According to the above-described configuration, the pressure detection unit detects an operation and the predetermined threshold value to be compared with strain by the pressure detection unit varies in accordance with a location of the touch panel unit. Accordingly, a two-dimensional coordinate obtained by an operation of touching any point on the operation surface of the touch panel unit is caused to be effective. The minimum of the predetermined threshold value is larger than a strain quantity obtained when water or the like is attached to the operation surface of the touch panel unit or larger than a value obtained by an electrical noise. Accordingly, a two-dimensional coordinate obtained by water is caused not to be effective when the water or the like is attached to the operation surface of the touch panel unit.

In the configuration, the predetermined threshold value becomes small as farther separation from the pressure detection unit is performed. According to the above-described configuration, a two-dimensional coordinate obtained through an operation of touching any point on the touch panel unit is caused to be effective.

In the configuration, the predetermined threshold value is set for each predetermined subdivision which is obtained by dividing an operation surface of the touch panel unit into a plurality of predetermined subdivisions.

According to the above-described configuration, a two-dimensional coordinate obtained through an operation of touching any point on the touch panel unit is caused to be effective.

In the configuration, the predetermined subdivision has a quadrangular shape.

According to the above-described configuration, a two-dimensional coordinate obtained through an operation of touching any point on the touch panel unit is caused to be effective.

In the configuration, the pressure detection unit includes a strain sensor which is smaller than the transparent member.

In the configuration, when strain is larger than the predetermined threshold value after a time point when variation in strain detected by the pressure detection unit is stable, a two-dimensional coordinate determined by the touch panel unit is caused to be effective.

According to the above-described configuration, only a two-dimensional coordinate corresponding to an operation is caused to be effective when multi-touch is performed at the plurality of subdivisions having different threshold values from each other on the operation surface of the touch panel unit.

In the configuration, when strain varies no longer or when decrease of the strain is detected for the first time, it is determined that the variation in strain is stable.

According to the above-described configuration, only a two-dimensional coordinate corresponding to an operation is caused to be effective.

In the configuration, when a plurality of two-dimensional coordinates determined by the touch panel unit are simultaneously present, a two-dimensional coordinate indicated later by the instructing object is caused to be effective.

According to the above-described configuration, only a two-dimensional coordinate corresponding to an operation is caused to be effective.

In the configuration, the predetermined threshold value is set to a value which does not cause a two-dimensional coordinate determined by the touch panel unit to be effective, in a normal operation in at least the subdivision on a lower end side of the touch panel.

According to the above-described configuration, a two-dimensional coordinate not corresponding to an operation is not caused to be effective even when an event of water or the like being collected on the touch panel, which causes an incorrect response occurs on the lower end side of the touch panel.

In the configuration, the transparent member is integrally formed with the touch panel unit.

According to the above-described configuration, assembly may be easily done by integrally forming the transparent member with the touch panel unit.

In the configuration, the pressure detection unit is configured by using a piezoelectric film.

According to the above-described configuration, it is possible to detect pressure generated by touching the touch panel unit with high accuracy.

Exemplary Embodiment 5

Hereinafter, Exemplary Embodiment 5 according to the present invention will be described with reference to the drawings.

Figure 22:
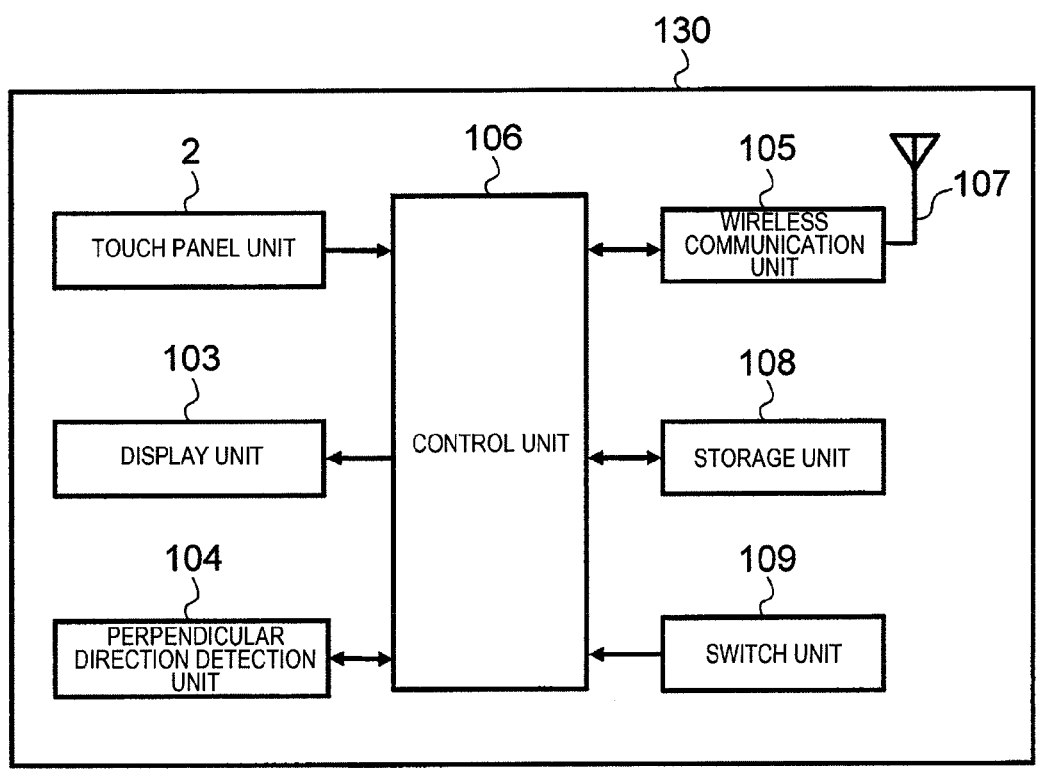
FIG. 22 is a block diagram illustrating a schematic configuration of an electronic apparatus according to Exemplary Embodiment 5 of the present invention.

FIG. 22 is a block diagram illustrating an example of a schematic configuration of electronic apparatus 130 according to Exemplary Embodiment 5 of the present invention.

As illustrated in FIG. 22, electronic apparatus 130 includes at least touch panel unit 2, display unit 103, perpendicular direction detection unit 104, wireless communication unit 105, control unit 106, antenna 107, storage unit 108, and switch unit 109. An example of electronic apparatus 130 includes a smart phone, a tablet, and the like.

Figure 23:
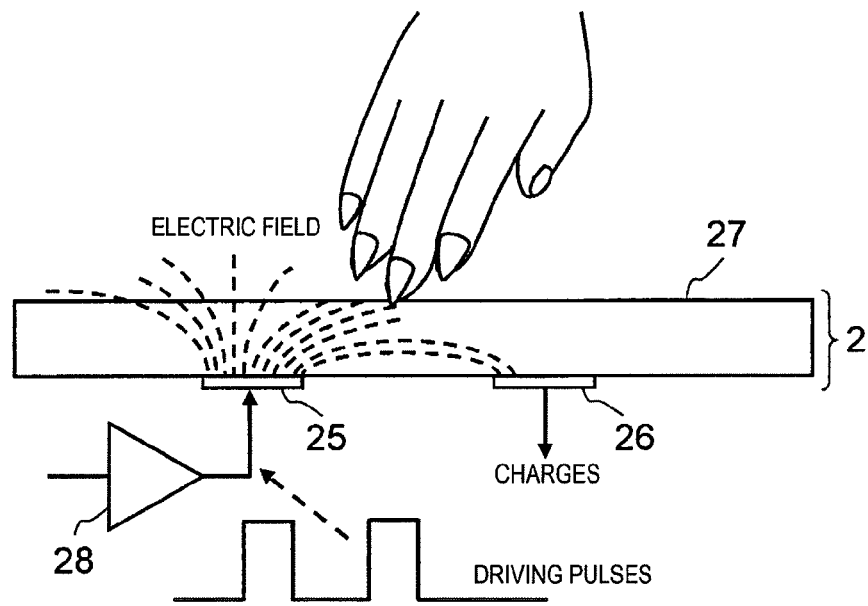
FIG. 23 is a diagram illustrating a schematic configuration of an electrostatic capacitive touch panel according to Exemplary Embodiment 5 and the like of the present invention.

Touch panel unit 2 corresponds to an electrostatic capacitive touch panel and includes transmission electrode 25 and reception electrode 26, as illustrated in FIG. 23. Transmission electrode 25 and reception electrode 26 are disposed on a lower surface of plate-shaped dielectric member 27 at a distance from each other. Driving pulses based on a transmission signal are applied to transmission electrode 25 through amplifier 28. An electric field is generated from transmission electrode 25 by applying the driving pulses to transmission electrode 25. When a finger or the like having conductivity enters into the electric field, the number of lines of electric force between transmission electrode 25 and reception electrode 26 is reduced and a variation in the number of lines of electric force appears as a variation in the charge in reception electrode 26.

Touch panel unit 2 sequentially outputs a two-dimensional coordinate (x, y) in display unit 103, which is indicated by a finger or the like to control unit 106 based on a reception signal generated in accordance with variation in the charges of reception electrode 26. That is, when a two-dimensional coordinate (x, y) is changed depending on movement of the finger or the like, touch panel unit 2 considers the changed two-dimensional coordinate as a two-dimensional coordinates (x, y) corresponding to the same finger or the like and sequentially outputs the two-dimensional coordinate. An operation described herein is performed by a control unit for a touch panel (not illustrated) included in touch panel unit 2.

Figure 24:
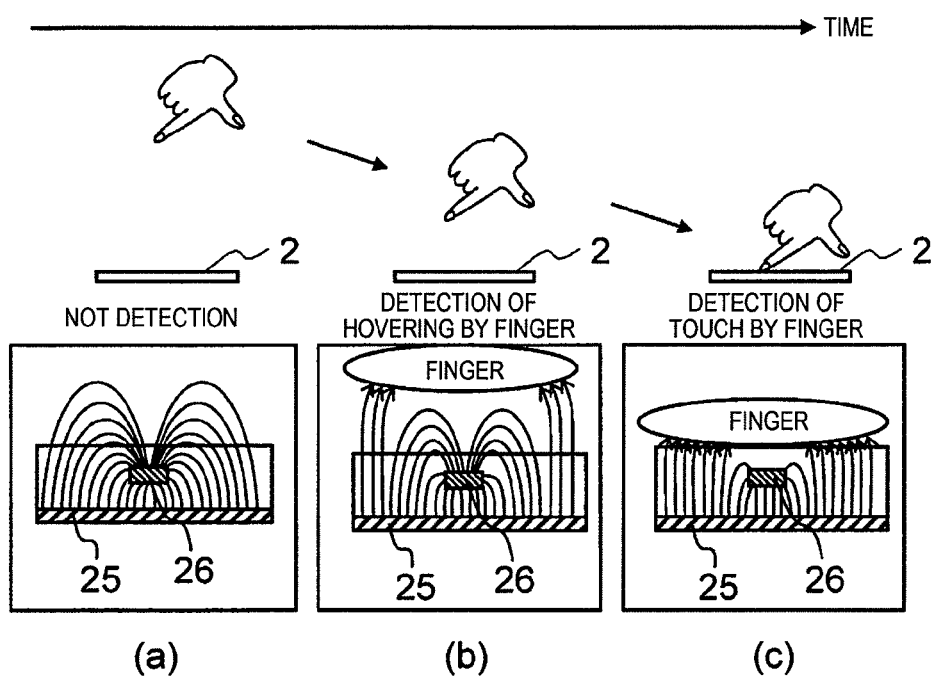
FIG. 24 is a diagram illustrating detection states when a finger gradually approaches the touch panel according to Exemplary Embodiment 5 and the like of the present invention.

FIG. 24 is a diagram illustrating detection states when a finger gradually approaches touch panel unit 2. (a) of FIG. 24 illustrates a state where the finger does not enter into an electric field, that is, a state where the finger is not detected. (b) of FIG. 24 illustrates a state where the finger enters into the electric field but the finger is not brought into contact with touch panel unit 2, that is, a state where a hover operation is detected. (c) of FIG. 24 illustrates a state where the finger enters into the electric field and comes into contact with touch panel unit 2, that is, a state where a touch operation is detected. When an operation of being brought into contact with touch panel unit 2 is performed by using the finger covered with gloves, the finger does not directly come into contact with touch panel unit 2 and thus the state of (b) in FIG. 24 occurs.

Figure 25:
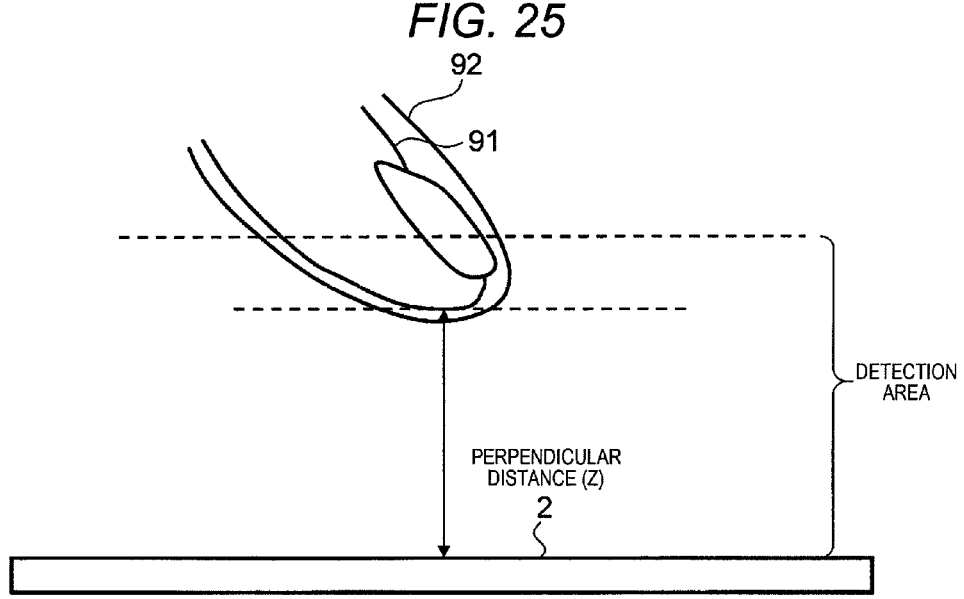
FIG. 25 is a diagram illustrating a detection area in the electronic apparatus according to Exemplary Embodiment 5 and the like of the present invention.

FIG. 25 illustrates the state where a hover operation is detected which is illustrated in (b) in FIG. 24, in detail. As illustrated in FIG. 25, when a perpendicular distance (z) between finger 91 and touch panel unit 2 is smaller than a predetermined distance, the state where a hover operation is detected occurs. The predetermined distance varies depending on the direction or the size of finger 91 or may be changed in accordance with design necessities. As described above, finger 91 may also be detected in a state where finger 91 is covered with gloves 92.

Touch panel unit 2 outputs a two-dimensional coordinate (x, y) corresponding to finger 91 when the state (including a touch state of the perpendicular distance=0) where a hover operation is detected occurs by finger 91. Then, as described above, touch panel unit 2 continues to output a two-dimensional coordinate (x, y) sequentially and outputs a two-dimensional coordinate (x, y) until finger 91 is far from touch panel unit 2 and the hover operation is not detected. The two-dimensional coordinate refers to a two-dimensional coordinate on a surface of touch panel unit 2 having a surface shape.

Returning to the description of the block diagram in FIG. 22, display unit 103 displays predetermined information instructed by control unit 106. Display unit 103 is configured by a liquid crystal display and a backlight, or an organic EL and the like. Perpendicular direction detection unit 104 is disposed in casing 140 and is configured by a gravity sensor. Perpendicular direction detection unit 104 detects a perpendicular direction in electronic apparatus 130 and notifies control unit 106 of the detected perpendicular direction. Storage unit 108 includes a volatile memory such as a dynamic random access memory (DRAM) and stores various settings when a user performs the various settings on electronic apparatus 130.

Control unit 106 controls each unit of electronic apparatus 130. Control unit 106 is configured by a central processing unit (CPU), a read only memory (ROM), a random access memory (RAM), and an interface circuit. A program for controlling the CPU is stored in the ROM and the RAM is used as a computation area when the CPU is operated. Antenna 107 is connected to wireless communication unit 105. Wireless communication unit 105 performs wireless transmission and wireless reception to and from the outside of the electronic apparatus through antenna 107 to transmit or receive data such as a program. Switch unit 109 is used for starting electronic apparatus 130 by an operation of a user or is used for an operation of returning to an initial state from an operating state of the electronic apparatus.

Figure 26:
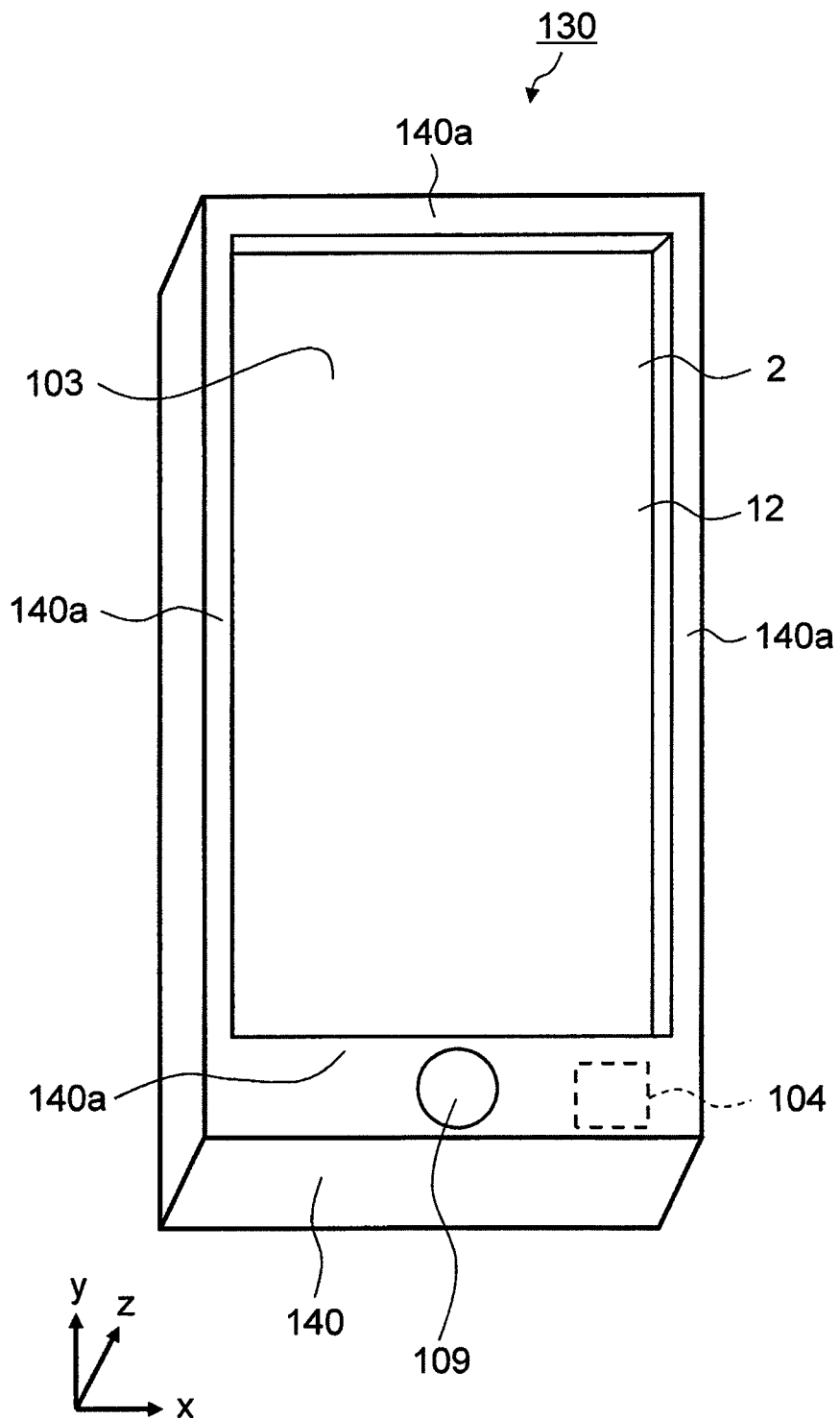
FIG. 26 is a perspective view illustrating an example of an appearance of a front surface of the electronic apparatus according to Exemplary Embodiment 5 of the present invention.

Electronic apparatus 130 has rectangular parallelepiped casing 140, as illustrated in FIG. 26. In FIG. 26, glass 12 which is a transparent member and touch panel unit 2 are disposed on a fore surface (front surface) side of casing 140. Glass 12 and touch panel unit 2 are formed to have a rectangular shape (square shape) in a plan view and each has an area smaller than the area of the fore surface of casing 140. Glass 12 is stacked on touch panel unit 2 so as to be disposed on a side ahead of touch panel unit 2.

In FIG. 26, a case where glass 12 and touch panel unit 2 have a rectangular shape is described. However, shapes of glass 12 and touch panel unit 2 are not limited to a rectangle.

For example, glass 12 and touch panel unit 2 may have a predetermined shape such as a triangular shape, a square shape, a polygonal shape, a circular shape, and an elliptical shape.

An x axis, a y axis, and a z axis which are marked on a lower left side of FIG. 26 are schematic marks collectively illustrating directions and orientations in each drawing. An arrow of the x axis indicates an orientation from negativeness to positiveness along the x axis. An arrow of the y axis indicates an orientation from negativeness to positiveness along the y axis, similarly. An arrow of the z axis indicates an orientation from negativeness to positiveness along the z axis, similarly. The arrow of each axis is similarly used in the following drawings. The positiveness or negativeness in each axis does not have simply only this technical meaning and is a concept used for collectively describing the orientation. This is similarly used in the following drawings.

Figure 27:
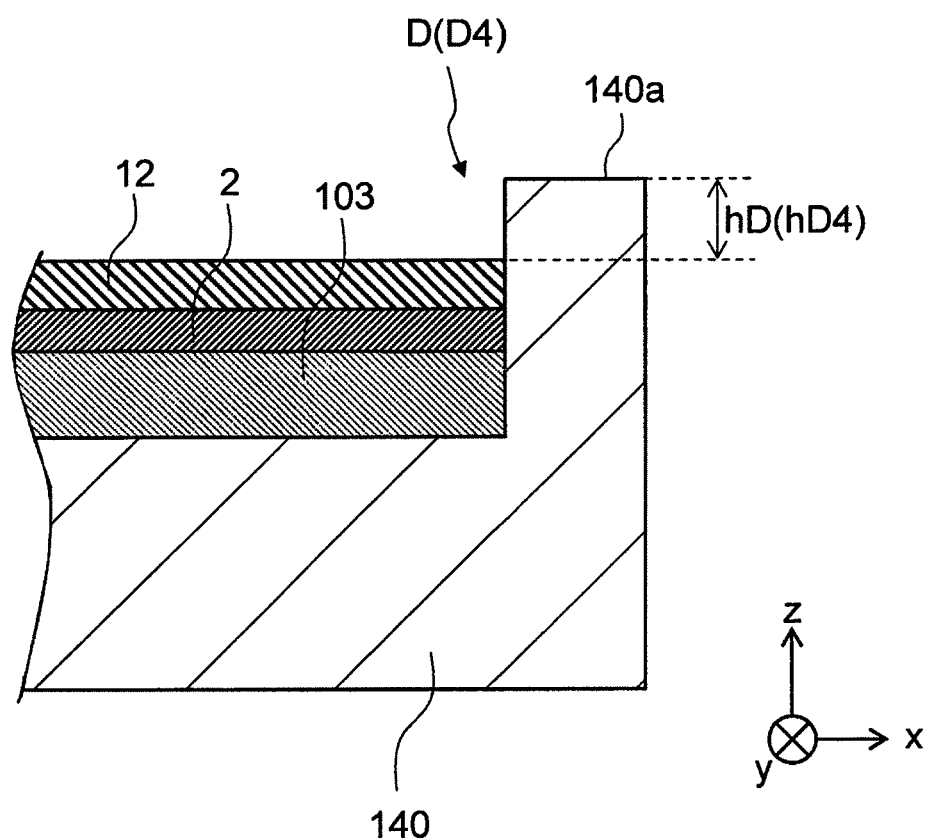
FIG. 27 is a cross-sectional view of the surroundings of an edge portion of the electronic apparatus according to Exemplary Embodiment 5 of the present invention.

FIG. 27 is a cross-sectional view illustrating a portion of a cross-section in an xz plane of FIG. 26 obtaining by cutting electronic apparatus 130 off.

A circle of the y axis which is marked on a lower right side of FIG. 27 and a mark of x in the circle indicate that the y axis is directed from the front of the surface of a paper to the back side of the surface of the paper along a direction vertical to the surface of the paper. In this case, the front of the surface of the paper in the y axis is set to be negative and the back side of the surface of the paper in the y axis is set to be positive. A circle of each axis and a mark of x in the circle are similarly used in the following drawings.

As illustrated in FIG. 27, glass 12, touch panel unit 2, and display unit 103 are disposed in an order from the positiveness to the negativeness along the z axis. In FIG. 27, glass 12 and touch panel unit 2 are illustrated as individual objects, but may be formed integrally. Casing 140 is formed so as to protrude the positiveness from the negativeness along the z axis on a positive side along the x axis based on glass 12 and to include edge portion 140a at a protruded end portion. Step D is formed between edge portion 140a and glass 12. Step D has height hD corresponding to a distance between edge portion 140a and glass 12, as illustrated in FIG. 27. Step D in FIG. 27 corresponds to a step D4 in FIG. 29 which will be described later.

FIG. 28A illustrates an appearance when electronic apparatus 130 stands up in a longitudinal direction and FIG. 28B illustrates a cross-section obtained by cutting electronic apparatus 130 in FIG. 28A off with a one-dot chain line.

A circle of the z axis and a point in the center of the circle which are marked on a lower right side in FIG. 28A indicate that the z axis is directed from the back side of the surface of the paper to the front of the surface of the paper along the direction vertical to the surface of the paper. In this case, the back side of the surface of the paper in the z axis is set to be negative and the front of the surface of the paper in the z axis is set to be positive. The circle of each axis and a point in the circle are similarly used in the following drawings.

An arrow with a white area which is marked on a lower side in FIG. 28A indicates a perpendicular direction. That is, the perpendicular direction in FIGS. 28A and 28B includes at least a direction component of the y axis from the positiveness to the negativeness. An arrow with a white area which is marked on a lower side in FIG. 28B indicates a perpendicular direction which is the same as the perpendicular direction in FIG. 28A. That is, the perpendicular direction in FIGS. 28A and 28B includes at least a direction component of the z axis from the positiveness to the negativeness. In electronic apparatus 130, as illustrated in FIG. 28B, a step D1 is formed between edge portion 140a and glass 12 on a positive side of the y axis and step D2 is formed between edge portion 140a and glass 12 on a negative side of the y axis.

Step D1 and step D2 respectively have height hD1 and height hD2 (not illustrated in FIG. 28) similarly to step D having height hD illustrated in FIG. 27. Water which comes into contact with glass 12 may flow along glass 12 in the perpendicular direction and the water 95 may be collected in the vicinity of step D2 when electronic apparatus 130 is supported to be positioned in the perpendicular direction illustrated in FIGS. 28A and 28B and is used in, for example, the rain or the like.

As illustrated in FIG. 28A, the width of display unit 103 in a transverse direction (x axis direction) is set to be wx and the width of display unit 103 in a longitudinal direction (y axis direction) is set to be wy. The relationship between wx and wy may be wx:wy=3:4, wx:wy=9:16, or the like and wx is shorter than wy in principle.

Figure 29B:
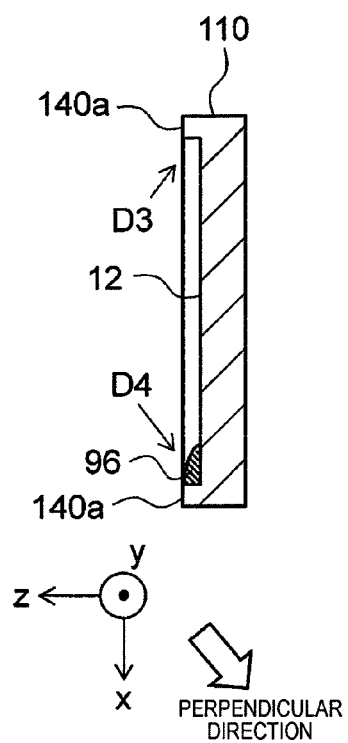
FIG. 29B is a cross-sectional view of the electronic apparatus according to Exemplary Embodiment 5 of the present invention when the electronic apparatus stands up in the transverse direction.
Figure 29A:
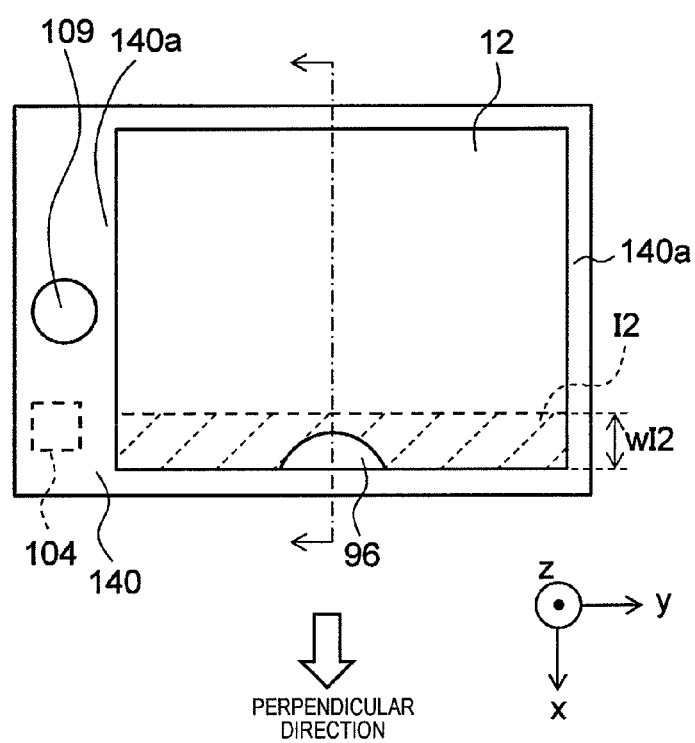
FIG. 29A is a view of an appearance of the electronic apparatus according to Exemplary Embodiment 5 of the present invention when the electronic apparatus stands up in a transverse direction.

FIG. 29A illustrates an appearance when electronic apparatus 130 stands up in the transverse direction and FIG. 29B illustrates a cross-section obtaining by cutting electronic apparatus 130 in FIG. 29A off with a one-dot chain line.

An arrow with a white area which is marked on a lower side in FIG. 29A indicates a perpendicular direction. That is, the perpendicular direction in FIGS. 29A and 29B includes at least a direction component of the x axis from the positiveness to the negativeness. An arrow with a white area which is marked on a lower side in FIG. 29B indicates a perpendicular direction which is the same as the perpendicular direction in FIG. 29A. That is, the perpendicular direction in FIGS. 29A and 29B includes at least a direction component of the z axis from the positiveness to the negativeness. In electronic apparatus 130, as illustrated in FIG. 29B, step D3 is formed between edge portion 140a and glass 12 on a negative side of the x axis and step D4 is formed between edge portion 140a and glass 12 on a positive side of the x axis.

Step D3 and step D4 respectively have height hD3 and height hD4 (not illustrated in FIG. 29) similarly to step D having height hD illustrated in FIG. 27. Thus, heights hD1, hD2, hD3, and hD4 are substantially equal to each other. Here, the heights being substantially equal means, for example, that a difference between the maximum and the minimum of hD1, hD2, hD3, and hD4 is equal to or less than 5% of an average value of hD1, hD2, hD3, and hD4, that the difference is equal to or less than 10%, that the difference is equal to or less than 20%, that the difference is equal to or less than 30%, that the difference is equal to or less than 40%, or that the difference is equal to or less than 50%. Water which comes into contact with glass 12 may flow along glass 12 in the perpendicular direction and the water 96 may be collected in the vicinity of step D4 when electronic apparatus 130 is supported to be positioned in the perpendicular direction illustrated in FIGS. 29A and 29B and is used in, for example, the rain or the like.

A case where steps D1 to D4 are formed between edge portion 140a of the casing and glass 12 is illustrated in FIGS. 27 to 29B. However, steps D1 to D4 are not limited to the case and may be a step which is disposed along a side of touch panel unit 2. For example, a step included in glass 12 itself may be applied.

Electronic apparatus 130 may include steps D1 to D4 which are respectively disposed on four sides of glass 12, as illustrated in FIGS. 28A to 29B, but is not limited to this configuration. Electronic apparatus 130 may include a step on at least one side.

Figure 30:
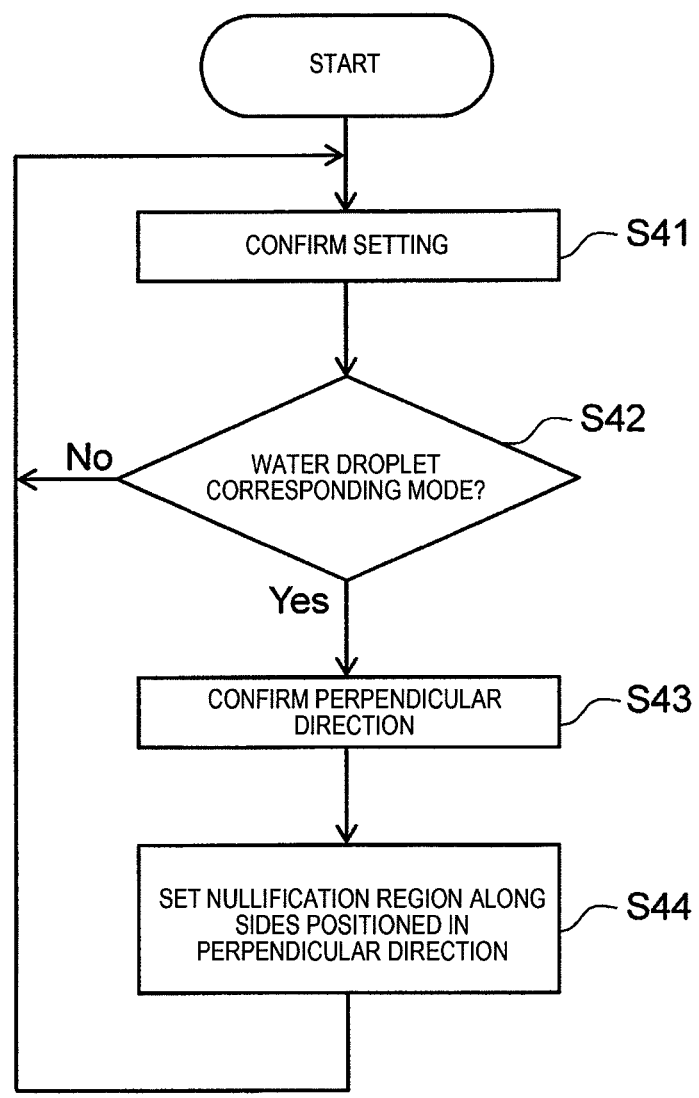
FIG. 30 is a flowchart illustrating an operation of the electronic apparatus according to Exemplary Embodiment 5 of the present invention.

FIG. 30 is a flowchart illustrating an operation relating to a nullification region of electronic apparatus 130. Electronic apparatus 130 includes at least a water droplet corresponding mode for corresponding to a water droplet such as rain and a normal mode for not corresponding to the water droplet particularly. Switching an operation mode of the water droplet corresponding mode, the normal mode, and the like may be set by a user and the setting is stored in storage unit 108.

In FIG. 30, control unit 106 confirms setting of the operation mode stored in storage unit 108 when an operation is started (Step S41). When the operation mode is not water droplet corresponding mode (NO in Step S42), control unit 106 controls the process to return to Step S41. When, in Step S42, the operation mode is water droplet corresponding mode (YES in Step S42), control unit 106 controls perpendicular direction detection unit 104 to confirm a perpendicular direction (Step S43). Then, control unit 106 sets a nullification region along a side of display unit 103 and touch panel unit 2 on a side toward the confirmed perpendicular direction (Step S44). Then, the process returns to Step S41.

The nullification region set along the side on the side toward the confirmed perpendicular direction will be described in a case illustrated in FIGS. 28A and 28B and a case illustrated in FIGS. 29A and 29B. As illustrated in FIGS. 28A and 28B, an area indicated by hatching with short dashed lines in FIG. 28A is set to nullification region I1 when electronic apparatus 130 stands up in the longitudinal direction. As illustrated in FIGS. 29A and 29B, an area indicated by hatching with short dashed lines in FIG. 29A is set to nullification region I2 when electronic apparatus 130 stands up in the transverse direction.

Nullification region I1 has first width wI1 along a side of display unit 103 on the negative side of the y axis, as illustrated in FIG. 28A. Nullification region I2 has second width wI2 along a side of display unit 103 on the positive side of the x axis, as illustrated in FIG. 29A. First width wI1 and second width wI2 are substantially equal to each other. Here, first width wI1 and second width wI2 being substantially equal means, for example, that an absolute value of a difference between wI1 and wI2 is equal to or less than 5% of an average value of wI1 and wI2, that the absolute value of the difference is equal to or less than 10% of the average value, that the absolute value of the difference is equal to or less than 20% of the average value, that the absolute value of the difference is equal to or less than 30% of the average value, that the absolute value of the difference is equal to or less than 40% of the average value, or that the absolute value of the difference is equal to or less than 50% of the average value.

Although a coordinate by touching touch panel unit 2 or the like is detected in the nullification region, control unit 106 does not determine the coordinate to be effective coordinate. That is, control unit 106 does not determine a coordinate by attaching a water droplet or the like in addition to a coordinate by touching of a finger or the like to be effective in the nullification region. Control unit 106 determines a coordinate detected in touch panel unit 2 to be effective in an area which is not the nullification region. Display unit 103 may display the effective coordinate.

Figure 31A:
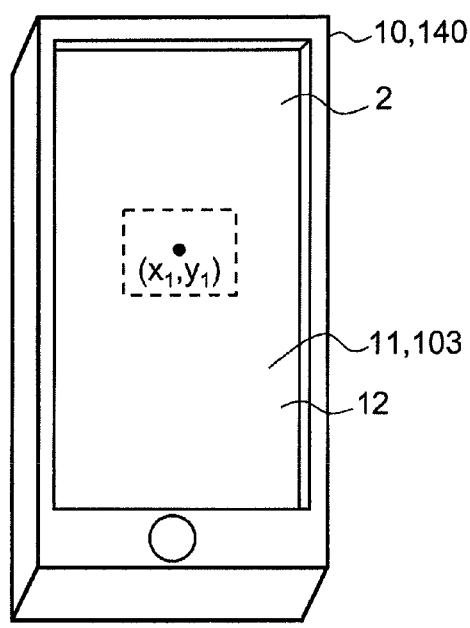
FIG. 31A is a diagram illustrating an example of an operation of displaying an icon in the electronic apparatus according to Exemplary Embodiment 5 and the like of the present invention.
Figure 31B:
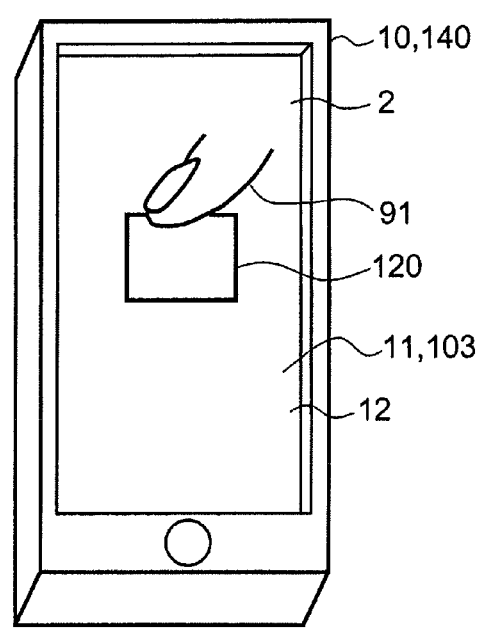
FIG. 31B is a diagram illustrating an example of an operation of displaying an icon in the electronic apparatus according to Exemplary Embodiment 5 and the like of the present invention.

An example of the effective coordinate will be described with reference to FIGS. 31A and 31B. As illustrated in FIG. 31A, when a two-dimensional coordinate $(x_1, y_1)$ is effective, icon 120 is displayed in display unit 103, as illustrated in FIG. 31B. In this case, the effective two-dimensional coordinate $(x_1, y_1)$ is not directly displayed, but is displayed in such a manner that icon 120 is displayed. That is, it is possible to catch enablement of display.

In FIG. 31B, a pointer (not illustrated) corresponding to a two-dimensional coordinate (x, y) may be displayed. In this case, when the pointer is superposed on icon 120, icon 120 may become a selectable state.

Such display of the pointer or icon 120 and start of a function corresponding to icon 120 are performed by an instruction of control unit 106. The concept of the effective coordinate illustrated in FIGS. 31A and 31B is not limited to this exemplary embodiment and may be applied to Exemplary Embodiments 1 to 4.

Returning to the description of the flowchart in FIG. 30, control unit 106 repeats the operations (Step S41, Step S42, Step S43, and Step S44) based on the flowchart in FIG. 30 and thus the nullification region which is set along the side in the perpendicular direction is changed every time the perpendicular direction of electronic apparatus 130 is changed. For example, when electronic apparatus 130 is supported to be positioned in the perpendicular direction as illustrated in FIGS. 28A and 28B, the nullification region is set as illustrated in FIG. 28A and then when electronic apparatus 130 is supported to be positioned in the perpendicular direction as illustrated in FIGS. 29A and 29B, the nullification region is changed as illustrated in FIG. 29A. Further then, when electronic apparatus 130 is supported to be positioned in the perpendicular direction as illustrated in FIGS. 28A and 28B, the nullification region returns to a nullification region as illustrated in FIG. 28A.

As described above, in electronic apparatus 130, the nullification region is disposed along the side of the touch panel in perpendicular direction, on which water droplets are easily collected and thus it is possible to suppress a probability of incorrectly detecting the collected water droplets as an operation of a user even though water droplets are collected at a step which is provided along the side.

Nullification regions I1 and I2 may or may not be displayed in display unit 103. When nullification regions I1 and I2 are displayed in display unit 103, an area by hatching with the short dashed lines may be filled with a predetermined color, for example. As the predetermined color, for example, black is considered. In addition, when the area is filled with the predetermined color, the filled area may have some transmittance and a screen to be normally displayed by display unit 103 under the filled area may be confirmed through the filled area.

In addition, the screen to be normally displayed is not displayed in nullification regions I1 and I2, and the screen to be normally displayed may be reduced to be displayed in an area excluding nullification regions I1 and I2. The screen to be normally displayed may be displayed to be scrolled in the area excluding nullification regions I1 and I2.

In electronic apparatus 130, heights hD1, hD2, hD3, and hD4 of steps D1, D2, D3, and D4 around display unit 103 are substantially equal (substantially constant) to each other, and first width wI1 and second width wI2 of the nullification region are substantially equal to each other. That is, since the heights of the steps are equal to each other, it is considered that amounts of the collected water droplets in the vicinity of the step are approximate to each other, and thus first width wI1 and second width wI2 of the nullification region are substantially equal (constant) to each other regardless of an aspect ratio of display unit 103.

In electronic apparatus 130 as describe above, it is assumed that the widths of the nullification region are equal to each other when the heights of the step are constant. However, it is not limited thereto. Considering that as the height of the step becomes larger, an amount of the collected water droplets in the vicinity of the step becomes larger, the width of the nullification region may become wide in accordance with the height of the step. For example, when hD2>hD4, the widths may be set to satisfy wI1>wI2. When hD2<hD4, the widths may be set to satisfy wI1<wI2.

In electronic apparatus 130, a touch operation by a finger or the like is detected by touch panel unit 2. However, it is not limited thereto. For example, as in electronic apparatuses 1, 50, 60, and 70, a touch operation may be determined by using pressure detection unit 3 and the like.

The present invention may be applied to an electronic apparatus using an electrostatic capacitive touch panel, such as a smart phone.

What is claimed is:

1. An electronic apparatus comprising:
   a casing;
   a display disposed in the casing;
   a touch panel overlapping the display, the touch panel being capable of determining two-dimensional coordinates on the display corresponding to an instructing object, and determining two dimensional coordinates on the display corresponding to a water drop located on the display;
   a gravity sensor capable of detecting a gravity direction;
   a step disposed along a side of the display, and defined by a surface of the display and the casing protruding from the display in an orthogonal direction with respect to the surface of the display; and
   a predetermined region on the display disposed along the side of the display in the gravity direction detected by the gravity sensor, wherein
   when the touch panel determines two-dimensional coordinates corresponding to at least the instructing object outside the predetermined region on the display, the electronic apparatus makes the determined two-dimensional coordinates corresponding to at least the instructing object valid,
   when the touch panel determines two-dimensional coordinates corresponding to at least the water drop within the predetermined region on the display, the electronic apparatus makes the determined two-dimensional coordinates corresponding to at least the water drop invalid.

2. The electronic apparatus of claim 1, wherein
a position of the predetermined region disposed along the side in the gravity direction changes depending on rotation of the casing and a change of the gravity direction with respect to the casing.

3. The electronic apparatus of claim 1, wherein
a height of the step is substantially constant regardless of the side of the display.

4. The electronic apparatus of claim 3, wherein
the predetermined region has a predetermined width along the side, and
the predetermined width is substantially constant regardless of the gravity direction.

5. The electronic apparatus of claim 1, wherein
the display displays the valid two-dimensional coordinates, and
the display does not display the invalid two-dimensional coordinates.

6. The electronic apparatus of claim 1, wherein
the display has a quadrangular shape.

7. The electronic apparatus of claim 1, wherein
the touch panel is capable of determining the two-dimensional coordinates corresponding to the instructing object positioned at a predetermined distance from the display.

8. The electronic apparatus of claim 7, wherein
the instructing object is a finger of a person, and
the touch panel is capable of determining the two-dimensional coordinates corresponding to the finger covered with a glove having an insulation property.

9. The electronic apparatus of claim 1, further comprising:
a transparent member overlapping the touch panel and having predetermined transmittance,
wherein the touch panel is disposed between the transparent member and the display.

10. The electronic apparatus of claim 9, wherein
the transparent member and the touch panel are integrally formed.

11. The electronic apparatus of claim 9, wherein
the casing has an edge portion at at least one portion of the surroundings of the display, and
the step is defined by the edge portion and the transparent member.

12. The electronic apparatus of claim 1, wherein
the display displays a predetermined image in the predetermined region.

13. The electronic apparatus of claim 12, wherein
the predetermined image comprising filling of the predetermined region with a predetermined color.

14. The electronic apparatus of claim 13, wherein
the predetermined color is black.

15. The electronic apparatus of claim 13, wherein
the filling with the predetermined color has transmittance.

* * * * *